United States Patent
Nemori

(10) Patent No.: US 8,036,149 B2
(45) Date of Patent: Oct. 11, 2011

(54) MULTI-CASTING COMMUNICATION SYSTEM, SERVER USED FOR THE SYSTEM, AND METHOD OF MAKING MULTI-CASTING COMMUNICATION

(75) Inventor: Hideo Nemori, Tokyo (JP)

(73) Assignee: NEC Corporation, Tokyo (JP)

( * ) Notice: Subject to any disclaimer, the term of this patent is extended or adjusted under 35 U.S.C. 154(b) by 478 days.

(21) Appl. No.: 11/795,321

(22) PCT Filed: Jan. 11, 2006

(86) PCT No.: PCT/JP2006/300231
§ 371 (c)(1),
(2), (4) Date: Jul. 16, 2007

(87) PCT Pub. No.: WO2006/075632
PCT Pub. Date: Jul. 20, 2006

(65) Prior Publication Data
US 2008/0123572 A1     May 29, 2008

(30) Foreign Application Priority Data

Jan. 17, 2005  (JP) ................ 2005-008907

(51) Int. Cl.
*H04L 5/16* (2006.01)
(52) U.S. Cl. ............. 370/296; 370/276; 455/514
(58) Field of Classification Search ........... 370/296
See application file for complete search history.

(56) References Cited

U.S. PATENT DOCUMENTS

| | | | |
|---|---|---|---|
| 5,276,678 A * | 1/1994 | Hendrickson et al. ....... | 370/267 |
| 5,901,363 A * | 5/1999 | Toyryla ....................... | 455/527 |
| 5,960,362 A | 9/1999 | Grob et al. | |
| 6,138,011 A | 10/2000 | Sanders, III et al. | |
| 6,590,885 B1 | 7/2003 | Jorgensen | |
| 6,594,246 B1 | 7/2003 | Jorgensen | |
| 6,628,629 B1 | 9/2003 | Jorgensen | |
| 6,680,922 B1 | 1/2004 | Jorgensen | |
| 6,862,622 B2 | 3/2005 | Jorgensen | |
| 7,251,218 B2 | 7/2007 | Jorgensen | |
| 2002/0099854 A1* | 7/2002 | Jorgensen ................ | 709/249 |
| 2003/0078064 A1* | 4/2003 | Chan ......................... | 455/514 |
| 2009/0271512 A1 | 10/2009 | Jorgensen | |

FOREIGN PATENT DOCUMENTS

| | | |
|---|---|---|
| EP | 1 622 406 A | 2/2006 |
| EP | 1 622 406 A1 * | 2/2006 |
| JP | 8-009063 | 1/1996 |
| JP | 8-505990 | 6/1996 |
| JP | 2000-513526 A | 10/2000 |
| JP | 2001-188740 A | 7/2001 |
| JP | 2002-522998 A | 7/2002 |
| JP | 2003-110492 A | 4/2003 |
| JP | 2003-521138 A | 7/2003 |

(Continued)

*Primary Examiner* — Daniel Wu
*Assistant Examiner* — Frederick Ott
(74) *Attorney, Agent, or Firm* — Foley & Lardner LLP

(57) ABSTRACT

In the multi-casting communication system, on receipt of a signal transmitted from one of mobile communication terminals with a half-duplex communication switch thereof being on, the PoC server records a user of the mobile communication terminal in a subscriber list as a next speaker, if there is another mobile communication terminal presently making multi-casting communication, and further if no mobile communication terminals are recorded in the subscriber list. Thus, it is clear who speaks next.

27 Claims, 15 Drawing Sheets

FOREIGN PATENT DOCUMENTS

| | | |
|---|---|---|
| JP | 2004-96558 A | 3/2004 |
| JP | 2004-112180 A | 4/2004 |
| JP | 2004-228648 A | 8/2004 |
| JP | 2005532703 A | 10/2005 |
| WO | WO 97/50267 A2 | 12/1997 |
| WO | WO 00/10099 | 2/2000 |
| WO | WO 03/036801 A2 | 5/2003 |

* cited by examiner

User A is Now Speaking

User A is Now Speaking,
User B is Recorded as
Next Speaker

User A has Finished
Speaking

User B Starts Speaking

User B is Recorded as Next Speaker

User D is Recorded as Second Next Speaker

MULTI-CASTING COMMUNICATION SYSTEM, SERVER USED FOR THE SYSTEM, AND METHOD OF MAKING MULTI-CASTING COMMUNICATION

This application is a National Phase of PCT/JP2006/300231, filed Jan. 11, 2006, which claims priority to Japanese Application No. 2005-008907, filed Jan. 17, 2005, the disclosures of which are hereby incorporated by reference in their entirety.

BACKGROUND OF THE INVENTION

1. Field of the Invention

The invention relates to a multi-casting communication system including mobile communication terminals, a server used for the multi-casting communication system, a method of making multi-casting communication, and a program for causing a server to make multi-casting communication, and more particularly to a multi-casting communication system including mobile phones each having a function of "push to talk over cellular" (hereinafter, referred to as "PoC") or personal data assistances (hereinafter, referred to as "PDA") having a function of making communication, a server used for the multi-casting communication system, a method of making multi-casting communication, and a program for causing a server to make multi-casting communication.

2. Description of the Related Art

One of functions a related mobile communication terminal has is a "PoC" function. The PoC function means a function allows a plurality of members joining to a group through a PoC server to make multi-casting communication by half-duplex communication through his/her mobile communication terminal as if they make conversation by means of a transceiver.

The PoC function is much characterized in accomplishing multi-casting communication by making half-duplex communication. While multi-casting communication is being made, when one of members joining to a group through a PoC server speaks (in particular, when he/she makes voice communication), other members are not allowed to speak the one of members finishes speaking.

Consequently, it is not clear to others as to who wants to speak next or who will speak next, resulting in that smooth conversation cannot be made.

That is, a related mobile communication terminal is accompanied with a problem that while one of members belonging to a certain conversation session is speaking by means of a PoC function, other members can listen to his/her words, but cannot speak, and accordingly, if a plurality of members belongs to a conversation session, it is not obvious to others as to who will speak next, resulting in that some of the members simultaneously actuate a PoC switch of his/her mobile communication terminal in order to speak next.

In order to avoid such a problem as mentioned above, some attempts have been made to make obvious who will speak next, when a plurality of members uses a PoC function of his/her own mobile communication terminals.

For instance, Japanese Patent Application Publication No. 2000-513526 (patent reference 1) has suggested a method of controlling accesses.

In the suggested method, when a first user who is allowed to make communication is making conversation through a remote unit in a dispatch system allowing a user to make communication with a plurality of other users, if a second user using another remote unit actuates a "push to talk" button (hereinafter, referred to as a "PTT" button) to break into the conversation, the second user is entitles to make conversation, if the second user at that time has a higher rank than a rank of the first user presently making conversation.

Japanese Patent Application Publication No. 2002-522988 (patent reference 2) has suggested a system for determining a speaking order in an audio conference accomplished by a computer network.

In the suggested system, when a user requests joining conversation in a computer-networked audio conference, a conference server adds the user's request into a waiting list equipped in the conference server. The conference server keeps judging whether the user's request is a top in the waiting list, and allows the user to start conversation, if the user's request is judged to be a top in the waiting list.

Thus, a combination of the method suggested in the patent reference 1 and the system suggested in the patent reference 2 would provide a dispatch system in which when a user requests joining conversation, he/she actuates a PTT button to inform a server of his/her request, and the server, if a user transmitting a request thereto has a higher rank than a rank of a user presently making conversation, allows the user to break into the conversation, but if a user transmitting a request thereto has a rank equal to or lower than a rank of a user presently making conversation, adds the user's request into a waiting list. When a user finishes making conversation, the server allows a user listed on a top of the waiting list to start conversation.

Patent Reference 1: Japanese Patent Application Publication No. 2000-513526 (pages 11 and 22, FIGS. 3A and 3B) (based on PCT/US97/10832)

Patent Reference 2: Japanese Patent Application Publication No. 2002-522988 (pages 15 and 43) (based on PCT/US99/18549)

However, even if the method suggested in the patent reference 1 were combined with the system suggested in the patent reference 2, a priority for joining conversation would be determined arbitrarily. In other words, a priority for joining conversation is not always optimally determined in accordance with the system.

Furthermore, it is not obvious to members belonging to a conversation session as to who is entitled to speak next, resulting in that a conversation session is not smoothly made.

In addition, since a priority for joining conversation is a predetermined fixed order, the above-mentioned combination system is accompanied with a problem that even if a user needs to speak for an urgent reason, he/she cannot join conversation.

Japanese Patent Application Publication No. 2001-188740 (published on July 2001) has suggested an electronic conference system in which a server preferentially provides a right to speak to a user who is in charge of a chairman among a plurality of users, and provides a right to speak to other users in dependence on proceeding of a conference. If a first user speaks to a second user, the server provides a right to speak next, to the second user.

Japanese Patent Application Publication No. 8-505990 (published on June 1996) which is based on PCT/FI94/00034 has suggested a conference system in which a priority is assigned to a speech theme, and a speech signal transmitted from a user having a highest priority among all of users is transmitted to all of users.

SUMMARY OF THE INVENTION

In view of the above-mentioned problems in the related system, it is an exemplary object of the present invention to provide a multi-casting communication system capable of determining an optimal order for members belonging to a group to speak.

It is further an exemplary object of the present invention to provide a multi-casting communication system capable of explicitly informing other members of who will speak next, while a certain member is speaking, in a conversation session to which a plurality of members joins.

It is further an exemplary object of the present invention to provide a multi-casting communication system capable of changing a speaking order, if necessary.

It is further an exemplary object of the present invention to provide a server used in the above-mentioned multi-casting communication system.

It is further an exemplary object of the present invention to provide a method of making multi-casting communication, which provides the same advantages as those provided by the above-mentioned multi-casting communication system.

It is further an exemplary object of the present invention to provide a program in accordance with which the above-mentioned server operates.

In order to achieve the above-mentioned objects, the present invention provides a multi-casting communication system allowing a plurality of mobile communication terminals to make multi-casting communication with one another in half-duplex communication, including a plurality of mobile communication terminals each capable of making voice-communication and mail-communication with other mobile communication terminals through a base station, and each including a half-duplex communication switch, and a controller, wherein the controller is designed to be able to make communication with the plurality of mobile communication terminals through a network, and to allow one of the plurality of mobile communication terminals to make duplex-communication for making multi-cast communication in accordance with a predetermined rule, on receipt of a signal transmitted from one first mobile communication terminal among the plurality of mobile communication terminals with the half-duplex communication switch being on, the controller checks whether there is a second mobile communication terminal which is presently making multi-cast communication, if there is not the second mobile communication terminal, and further if there is not recorded one or more third mobile communication terminal in a subscriber list (waiting list), the controller allows the first mobile communication terminal to make multi-casting communication, if there is at least one of the second mobile communication terminal and the third mobile communication terminal recorded in the subscriber list, the controller records the first mobile communication terminal in the subscriber list to make reservation of making multi-casting communication for the first mobile communication terminal.

As mentioned above, in the multi-casting communication system in accordance with the present invention, on receipt of a signal transmitted from a first mobile communication terminal among a plurality of mobile communication terminals, requesting joining the conversation, the controller, if there is a second mobile communication terminal presently making multi-casting communication, and further if there is not recorded a mobile communication terminal in a subscriber list, records the first mobile communication terminal in the waiting list, and allows the first mobile communication terminal to start speaking, after the second mobile communication terminal has finished speaking. Thus, the multi-casting communication system in accordance with the present invention makes it possible to optimally determine a speaking order, ensuring smooth conversation (multi-casting communication) in a group of users of a mobile communication terminal.

It is preferable that the controller updates data about communication status of each of the plurality of mobile communication terminals, records a mobile communication terminal which is to be allowed to make multi-casting communication next time or later in a subscriber list, and transmits data about communication status of a mobile communication terminal(s) recorded in the subscriber list, to the plurality of mobile communication terminals.

If a user is recorded in a subscriber list as a next speaker while another user among a plurality of users joining a conversation session is speaking, information indicative of the next speaker is transmitted to the other users. Thus, all of users in a group commonly have information indicative of the next speaker, and it is obvious for members of a group as to who will speak next, ensuring smooth conversation session.

For instance, a priority may be applied to each of the plurality of mobile communication terminals in accordance with a characteristic thereof, in which case, the controller, when the first mobile communication terminal is to be recorded in the subscriber list, records the first mobile communication terminal and the third mobile communication terminal(s) recorded in the subscriber list in an order to be determined in accordance with the priority.

On receipt of a signal transmitted from the first mobile communication terminal with the half-duplex communication switch being on, the controller, if there is the second mobile communication terminal presently making multi-casting communication, and further if there is recorded the third mobile communication terminal in the subscriber list, may be designed to compare priorities of the first and second mobile communication terminals to each other, and allow the first mobile communication terminal to make multi-casting communication in interruption, if the controller judges that the first mobile communication terminal has a priority higher than a priority of second mobile communication terminal.

If two or more users want to speak next, the controller compares priorities assigned to the users with one another, and allows a user having a highest priority to speak. In the multi-casting communication system in accordance with the present invention, since a speaking order is rationally determined, it would be possible to ensure smooth conversation (multi-casting communication) in a group of mobile communication terminal users.

A predetermined one of the plurality of mobile communication terminals may be determined as a privilege user's terminal, in which case, a priority is applied to mobile communication terminals other than the privilege user's terminal in accordance with a characteristic thereof, and the privilege user's terminal is entitled to record mobile communication terminals other than the privilege user's terminal into the subscriber list, delete mobile communication terminals other than the privilege user's terminal out of the subscriber list, and make interruption into multi-casting communication.

The privilege user's terminal is designed to have a power of recording mobile communication terminals other than the privilege user's terminal into a subscriber list, deleting mobile communication terminals other than the privilege user's terminal out of the subscriber list, and breaking into conversation presently made. Hence, a user of the privilege user's terminal can arbitrarily change a priority of a mobile communication terminal other than the privilege user's terminal to give an order of speaking to another user. Thus, even if a certain user had a low priority among mobile communication terminals other than the privilege user's terminal, the certain user may be able to preferentially have a right of speaking in dependence on content of the conversation. Thus, it is possible to accomplish multi-casting communication having high flexibility and serviceability.

On receipt of a signal transmitted from the third mobile communication terminal recorded in the subscriber list with the half-duplex communication switch being on, the controller may be designed to cancel recordation of the third mobile communication terminal out of the subscriber list.

For instance, if the controller finds a user who is optimal as a next speaker after another user was recorded as a next speaker in a subscriber list, the controller may cancel the recordation of the another user to thereby allow the user to speak next.

The characteristic of the mobile communication terminals may be comprised of residual power of a battery of a mobile communication terminal, in which case, a higher priority may be applied to a mobile communication terminal including a battery having less residual power.

As an alternative, the characteristic of the mobile communication terminals may be comprised of a sensitivity of an antenna of a mobile communication terminal, in which case, a higher priority may be applied to a mobile communication terminal including an antenna having a lower sensitivity.

The controller may be comprised of a first server and a second server, in which case, the first server is designed to be able to make communication with the plurality of mobile communication terminals through a network, and to allow one of the plurality of mobile communication terminals to make duplex-communication for making multi-cast communication in accordance with a predetermined rule, on receipt of a signal transmitted from one first mobile communication terminal among the plurality of mobile communication terminals with the half-duplex communication switch being on, the first server checks whether there is a second mobile communication terminal which is presently making multi-cast communication, if there is not the second mobile communication terminal, and further if there is not recorded one or more third mobile communication terminal in a subscriber list, the first server allows the first mobile communication terminal to make multi-casting communication, and if there is at least one of the second mobile communication terminal and the third mobile communication terminal recorded in the subscriber list, the first server records the first mobile communication terminal in the subscriber list to make reservation of making multi-casting communication for the first mobile communication terminal. The second server is designed to be able to make communication with the first server, and update data about communication status of each of the plurality of mobile communication terminals, record a mobile communication terminal which is to be allowed to make multi-casting communication next time or later in a subscriber list, and transmit data about communication status of a mobile communication terminal(s) recorded in the subscriber list, to the plurality of mobile communication terminals.

By comprising the controller of two servers, it would be possible to reduce a load to be exerted on each of the servers in comparison with a multi-casting communication system including a single server, ensuring an increase in a processing speed of each of the servers.

The multi-casting communication system in accordance with the present invention may be designed to include an administrator capable of making communication with the plurality of mobile communication terminals through the controller, and administrating the plurality of mobile communication terminals as a group for making multi-cast communication.

When the controller is comprised of a first server and a second server, the above-mentioned administrator is designed to be able to make communication with the plurality of mobile communication terminals through the first server.

The administrator makes it possible to accurately judge whether a mobile communication terminal user is entitled to join a conversation session.

For instance, the mobile communication terminal may be comprised of a mobile phone.

The present invention further provides a server used in a multi-casting communication system allowing a plurality of mobile communication terminals to make multi-casting communication with one another in half-duplex communication, each of the mobile communication terminals being capable of making voice-communication and mail-communication with other mobile communication terminals through a base station, and including a half-duplex communication switch, the server being designed to be able to make communication with the plurality of mobile communication terminals through a network, and to allow one of the plurality of mobile communication terminals to make duplex-communication for making multi-cast communication in accordance with a predetermined rule, on receipt of a signal transmitted from one first mobile communication terminal among the plurality of mobile communication terminals with the half-duplex communication switch being on, the server checking whether there is a second mobile communication terminal which is presently making multi-cast communication, if there is not the second mobile communication terminal, and further if there is not recorded one or more third mobile communication terminal in a subscriber list, the server allowing the first mobile communication terminal to make multi-casting communication, and if there is at least one of the second mobile communication terminal and the third mobile communication terminal recorded in the subscriber list, the server recording the first mobile communication terminal in the subscriber list to make reservation of making multi-casting communication for the first mobile communication terminal.

The server in accordance with the present invention may be designed to update data about communication status of each of the plurality of mobile communication terminals, record a mobile communication terminal which is to be allowed to make multi-casting communication next time or later in a subscriber list, and transmit data about communication status of a mobile communication terminal(s) recorded in the subscriber list, to the plurality of mobile communication terminals.

A priority may be applied to each of the plurality of mobile communication terminals in accordance with a characteristic thereof, in which case, the server, when the first mobile communication terminal is to be recorded in the subscriber list, records the first mobile communication terminal and the third mobile communication terminal(s) recorded in the subscriber list in an order to be determined in accordance with the priority.

On receipt of a signal transmitted from the first mobile communication terminal with the half-duplex communication switch being on, the server, if there is the second mobile communication terminal presently making multi-casting communication, and further if there is recorded the third mobile communication terminal in the subscriber list, may be designed to compare priorities of the first and second mobile communication terminals to each other, and allow the first mobile communication terminal to make multi-casting communication in interruption, if the server judges that the first mobile communication terminal has a priority higher than a priority of second mobile communication terminal.

On receipt of a signal transmitted from the third mobile communication terminal recorded in the subscriber list with the half-duplex communication switch being on, the server may be designed to cancel recordation of the third mobile communication terminal out of the subscriber list.

The server may be comprised of a first server and a second server. The first server may be designed to be able to make communication with the plurality of mobile communication terminals through a network, and to allow one of the plurality of mobile communication terminals to make duplex-communication for making multi-cast communication in accordance with a predetermined rule. On receipt of a signal transmitted from one first mobile communication terminal among the plurality of mobile communication terminals with the half-duplex communication switch being on, the first server checks whether there is a second mobile communication terminal which is presently making multi-cast communication. If there is not the second mobile communication terminal, and further if there is not recorded one or more third mobile communication terminal in a subscriber list, the first server allows the first mobile communication terminal to make multi-casting communication. If there is at least one of the second mobile communication terminal and the third mobile communication terminal recorded in the subscriber list, the first server records the first mobile communication terminal in the subscriber list to make reservation of making multi-casting communication for the first mobile communication terminal. The second server may be designed to update data about communication status of each of the plurality of mobile communication terminals, record a mobile communication terminal which is to be allowed to make multi-casting communication next time or later in a subscriber list, and transmit data about communication status of a mobile communication terminal(s) recorded in the subscriber list, to the plurality of mobile communication terminals.

The present invention further provides a method of making multi-casting communication in a multi-casting communication system allowing a plurality of mobile communication terminals to make multi-casting communication with one another through a server in half-duplex communication, each of the mobile communication terminals being capable of making voice-communication and mail-communication with other mobile communication terminals through a base station, and including a half-duplex communication switch, including the server allowing one of the plurality of mobile communication terminals to make duplex-communication for making multi-cast communication in accordance with a predetermined rule, on receipt of a signal transmitted from one first mobile communication terminal among the plurality of mobile communication terminals with the half-duplex communication switch being on, the server checking whether there is a second mobile communication terminal which is presently making multi-cast communication, if there is not the second mobile communication terminal, and further if there is not recorded one or more third mobile communication terminal in a subscriber list, the server allowing the first mobile communication terminal to make multi-casting communication, and if there is at least one of the second mobile communication terminal and the third mobile communication terminal recorded in the subscriber list, the server recording the first mobile communication terminal in the subscriber list to make reservation of making multi-casting communication for the first mobile communication terminal.

The method may further include the server's updating data about communication status of each of the plurality of mobile communication terminals, the server's recording a mobile communication terminal which is to be allowed to make multi-casting communication next time or later in a subscriber list, and the server's transmitting data about communication status of a mobile communication terminal(s) recorded in the subscriber list, to the plurality of mobile communication terminals.

A priority may be applied to each of the plurality of mobile communication terminals in accordance with a characteristic thereof, in which case, in recording the first mobile communication terminal in the subscriber list, the first mobile communication terminal and the third mobile communication terminal(s) recorded in the subscriber list may be recorded in an order to be determined in accordance with the priority.

The method may further include, on receipt of a signal transmitted from the first mobile communication terminal with the half-duplex communication switch being on, if there is the second mobile communication terminal presently making multi-casting communication, and further if there is recorded the third mobile communication terminal in the subscriber list, comparing priorities of the first and second mobile communication terminals to each other, and allowing the first mobile communication terminal to make multi-casting communication in interruption, if the server judges that the first mobile communication terminal has a priority higher than a priority of second mobile communication terminal.

A predetermined one of the plurality of mobile communication terminals may be determined as a privilege user's terminal, and a priority is applied to mobile communication terminals other than the privilege user's terminal in accordance with a characteristic thereof, in which case, the method may further include recording mobile communication terminals other than the privilege user's terminal into the subscriber list, deleting mobile communication terminals other than the privilege user's terminal out of the subscriber list, and making interruption into multi-casting communication.

The method may further include, on receipt of a signal transmitted from the third mobile communication terminal recorded in the subscriber list with the half-duplex communication switch being on, canceling recordation of the third mobile communication terminal out of the subscriber list.

The present invention further provides a program for causing a computer to carry out a method of making multi-casting communication in a multi-casting communication system allowing a plurality of mobile communication terminals to make multi-casting communication with one another through a server in half-duplex communication, each of the mobile communication terminals being capable of making voice-communication and mail-communication with other mobile communication terminals through a base station, and including a half-duplex communication switch, steps executed by the computer in accordance with the program including a first step of allowing one of the plurality of mobile communication terminals to make duplex-communication for making multi-cast communication in accordance with a predetermined rule, a second step of, on receipt of a signal transmitted from one first mobile communication terminal among the plurality of mobile communication terminals with the half-duplex communication switch being on, checking whether there is a second mobile communication terminal which is presently making multi-cast communication, a third step of, if there is not the second mobile communication terminal, and further if there is not recorded one or more third mobile communication terminal in a subscriber list, allowing the first mobile communication terminal to make multi-casting communication, and a fourth step of, if there is at least one of the second mobile communication terminal and the third mobile communication terminal recorded in the subscriber list, recording the first mobile communication terminal in the subscriber list to make reservation of making multi-casting communication for the first mobile communication terminal.

The steps to be executed by the program may further include updating data about communication status of each of the plurality of mobile communication terminals, recording a mobile communication terminal which is to be allowed to make multi-casting communication next time or later in a subscriber list, and transmitting data about communication status of a mobile communication terminal(s) recorded in the subscriber list, to the plurality of mobile communication terminals.

A priority may be applied to each of the plurality of mobile communication terminals in accordance with a characteristic thereof, in which case, the first mobile communication terminal and the third mobile communication terminal(s) recorded in the subscriber list may be recorded in an order to be determined in accordance with the priority in the fourth step.

The program to be executed by the program may further include, on receipt of a signal transmitted from the first mobile communication terminal with the half-duplex communication switch being on, if there is the second mobile communication terminal presently making multi-casting communication, and further if there is recorded the third mobile communication terminal in the subscriber list, comparing priorities of the first and second mobile communication terminals to each other, and allowing the first mobile communication terminal to make multi-casting communication in interruption, if the server judges that the first mobile communication terminal has a priority higher than a priority of second mobile communication terminal.

The program to be executed by the program may further include, on receipt of a signal transmitted from the third mobile communication terminal recorded in the subscriber list with the half-duplex communication switch being on, canceling recordation of the third mobile communication terminal out of the subscriber list.

The above and other objects and advantageous features of the present invention will be made apparent from the following description made with reference to the accompanying drawings, in which like reference characters designate the same or similar parts throughout the drawings.

DESCRIPTION OF THE EXEMPLARY EMBODIMENTS

Hereinbelow, embodiments in accordance with the present invention are described with reference to drawings.

First Exemplary Embodiment

Figure 1:
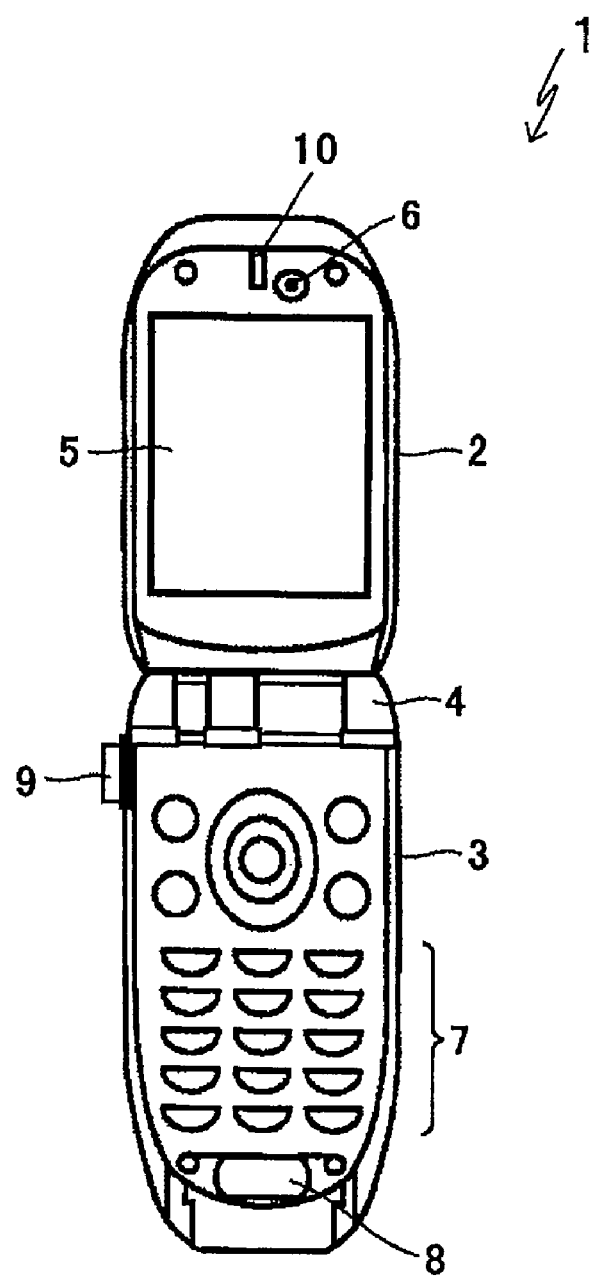
FIG. 1 is a front view of a mobile communication terminal used in a multi-casting communication system in accordance with the first embodiment.

FIG. 1 is a front view of an example of a mobile communication terminal used in a multi-casting communication system in accordance with the first embodiment of the present invention.

The mobile communication terminal used in the first embodiment is comprised of a foldable mobile phone 1.

As illustrated in FIG. 1, the foldable mobile phone 1 is comprised of an upper case 2, a lower case 3, and a hinge 4 rotatably connecting a lower end of the upper case 2 and an upper end of the lower case 3 with each other.

By rotating the upper case 2 or the lower case 3 about the hinge 4, the mobile phone 1 is either in a closed position in which the upper case 2 and the lower case 3 are folded such that their inner surfaces face each other, or in an open position in which the inner surfaces of the upper case 2 and the lower case 3 are spaced from each other. The mobile phone 1 illustrated in FIG. 1 is in an open position.

The hinge 4 may be fabricated as a part separate from the upper case 2 and the lower case 3. As an alternative, the hinge 4 may be formed as a part of the upper case 2 and/or the lower case 3.

A display unit 5 for displaying various images, and a speaker 6 uttering calling bell and/or received voices are arranged on an inner surface of the upper case 2. A light emitter 10 comprised of a light-emitting diode (LED) is arranged in the vicinity of an upper end of an inner surface of the upper case 2.

The display unit 5 is comprised of a liquid crystal display unit, for instance. The light emitter 10 emits light while a user is making conversation through the mobile phone 1 to show that the mobile phone 1 is in operation.

An input unit 7 comprised of a plurality of keys for inputting various data into the mobile phone 1, and a microphone 8 for collecting user's voices to be transmitted are arranged on an inner surface of the lower case 3.

A PoC switch 9 is arranged on a side of the lower case 3.

When a user wants to join conversation being made by a group including a plurality of members (mobile phone users) joining the conversation through a PoC server 25 (see FIG. 2), the user keeps pushing the PoC switch 9 like a switch of a transceiver to transmit his/her voices.

As mentioned later, the PoC switch 9 is used in the first embodiment also to record a request of speaking next in a subscriber list (waiting list) or cancel the recordation.

The PoC switch 9 is disposed at a side of the lower case 3 of the mobile phone 1 in the first embodiment. However, it should be noted that a position of the PoC switch 9 is not to be limited to a side of the lower case 3. For instance, one of keys defining the input unit 7 may be used as the PoC switch 9.

Since a user of the mobile phone 1 is necessary to keep pushing the PoC switch 9 in making multi-casting communication or conversation, it is necessary for the PoC switch 9 to be situated such that a user can keep pushing the PoC switch 9 during holding the mobile phone 1 with one of his/her hands. From this standpoint, it is preferable that the PoC switch 9 is arranged at a side of the lower case or a back of the lower case 3.

The foldable mobile phone 1 makes radio-signal communication with a closes base station (not illustrated), and establishes a communication channel with another mobile phone via the base station through a public network to make voice communication or receive/transmit mail data. Since the foldable mobile phone 1 operates in a conventional manner, and an operation of the mobile phone 1 is not relevant to the present invention, an operation of the mobile phone 1 is not explained.

As mentioned later, the foldable mobile phone 1 is designed to be able to make half-duplex communication by keeping the PoC switch 9 pushed when voice data is to be transmitted to other users in multi-casting communication while conversation is being made by a plurality of members (mobile phone users) joining thereto through a PoC server.

A mobile phone to be used in the second or subsequent embodiments is identical with the mobile phone 1 used in the first embodiment.

Figure 2:
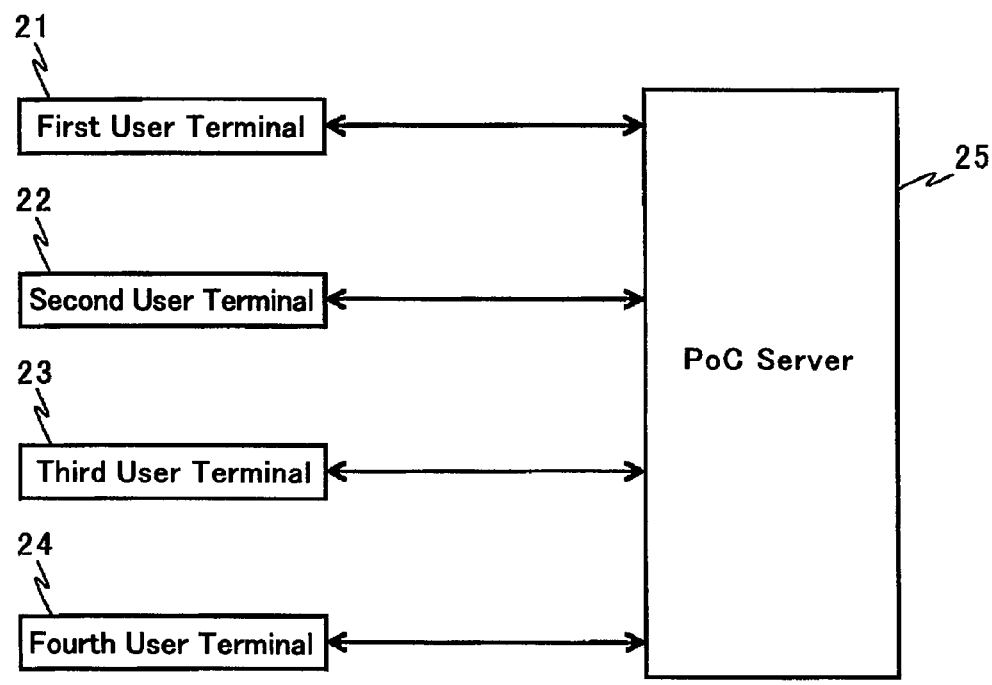
FIG. 2 is a block diagram of the multi-casting communication system in accordance with the first embodiment.

FIG. 2 is a block diagram of a multi-casting communication system in accordance with the first embodiment of the present invention.

The multi-casting communication system in accordance with the first embodiment is comprised of first to fourth user terminals 21 to 24, and a PoC server 25 designed to be able to make communication with the first to fourth user terminals 21 to 24 through a network (not illustrated).

Each of the first to fourth user terminals 21 to 24 is comprised of the foldable mobile phone 1 illustrated in FIG. 1.

Figure 3:
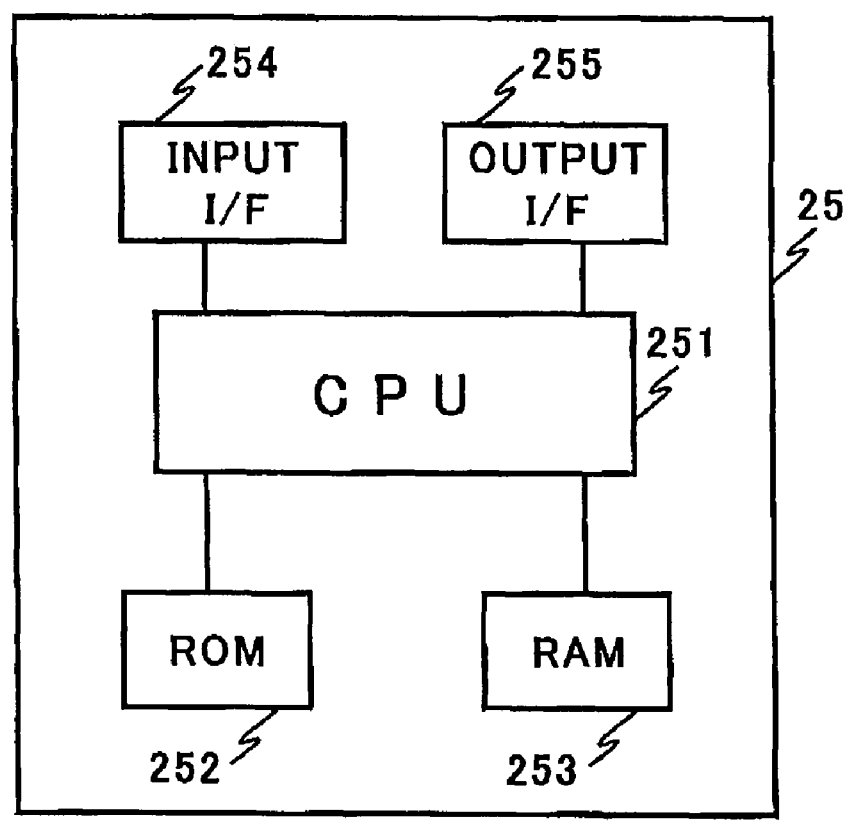
FIG. 3 is a block diagram of a PoC server in the multi-casting communication system in accordance with the first embodiment.

FIG. 3 is a block diagram of the PoC server 25.

The PoC server 25 is comprised of a central processing unit (CPU) 251, a first memory 22, a second memory 253, an input interface 254 through which various commands and data are input into the central processing unit 251, and an output interface 255 through which results of steps executed by the central processing unit 251 are output.

Each of the first and second memories 252 and 253 is comprised of a semiconductor memory such as a read only memory (ROM), a random access memory (RAM) or an IC memory card, or a storage device such as a flexible disc, a hard disc, or an optic magnetic disc. In the first embodiment, the first memory 252 comprises a read only memory (ROM), and the second memory 253 comprises a random access memory (RAM).

As mentioned later, the first memory 252 stores therein a program for causing a computer to carry out a method of determining next and subsequent speakers and a speaking order in accordance with a predetermined rule.

The second memory 253 stores therein various data and parameters, and presents a working area to the central processing unit 251.

Furthermore, the second memory 253 in the first embodiment stores a subscriber list (waiting list) therein. In the subscriber list are recorded users waiting a speaking order. For instance, phone numbers of the user terminals of users waiting his/her speaking order are recorded in the subscriber list.

In addition, a priority for a speaking order is applied to each of the first to fourth user terminals 21 to 24 in dependence on a characteristic of each of the first to fourth user terminals 21 to 24. The priorities of the first to fourth user terminals 21 to 24 are stored in the second memory 253. The central processing unit 251 reads a priority out of the second memory 253, when necessary.

The central processing unit 251 reads the program out of the first memory 252, and executes the program. In other words, the central processing unit 251 operates in accordance with the program stored in the first memory 252. Specifically, as mentioned later, the central processing unit 251 of the PoC server 25 determines a user entitled to speak among users of the mobile phone 1 joining a conversation session, and further determines who will speak next among users other than a user entitled to speak, in accordance with a program stored in the first memory 251.

Figure 4:
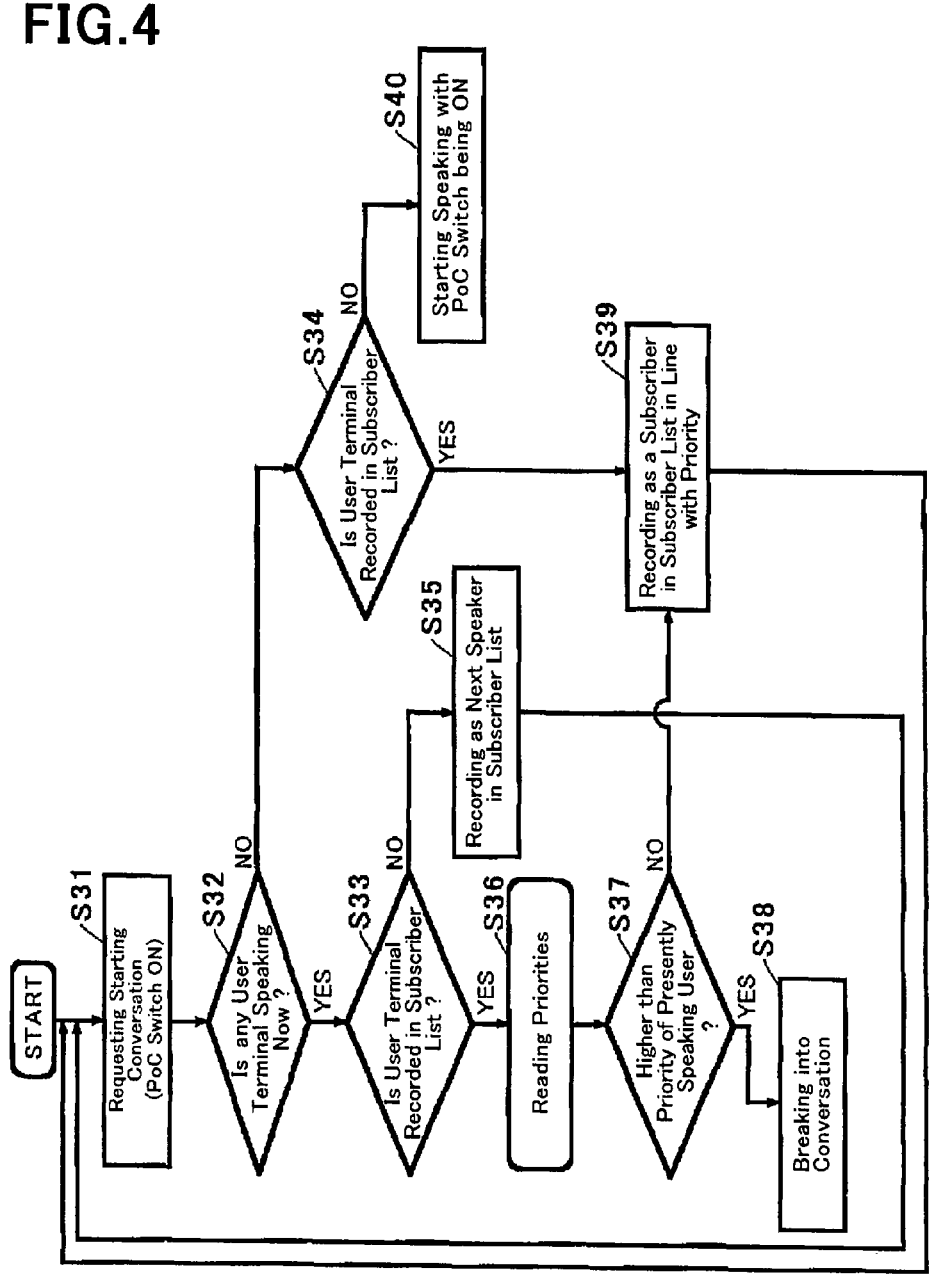
FIG. 4 is a flow-chart showing steps to be carried out in the multi-casting communication system in accordance with the first embodiment.

FIG. 4 is a flowchart showing steps to be carried out in the multi-casting communication system in accordance with the first embodiment.

Hereinbelow is explained an operation of the multi-casting communication system in accordance with the first embodiment, with reference to FIG. 4.

Assuming that a user of the first user terminal 21 wants to speak in a group of a plurality of users each using the mobile phone 1, the user pushes the PoC switch 9 of the first user terminal 21, that is, turns the PoC switch 9 on (step S31).

When the PoC switch 9 of the first user terminal 21 was pushed, the central processing unit 251 of the PoC server 25 checks whether any user terminal is presently speaking or not (step S32).

If there is no user terminal who is presently speaking (NO in step S32), the central processing unit 251 checks whether a user terminal is recorded in a subscriber list stored in the second memory 253 as a next speaker (step S34).

Only when there is no user terminal recorded in a subscriber list as a next speaker (NO in step S34), the central processing unit 251 of the PoC server 25 transmits a signal indicative of allowance of speaking, to the first user terminal 21. This signal is displayed in the display unit 5 of the first user terminal 21.

Conforming that the signal is being displayed in the display unit 4, a user of the first user terminal 21 turns the PoC switch 9 on. Thus, a user of the first user terminal 21 can start speaking (step S40).

Voices of a user of the first user terminal 21 are transmitted to the second to fourth user terminals 22 to 24 while the PoC switch 9 is kept on.

If the central processing unit 251 of the PoC server 25 judges that there is a user terminal who is presently speaking (YES in step S32), the central processing unit 251 further checks whether there is a user terminal recorded in a subscriber list stored in the second memory 253 (step S33).

When the central processing unit 251 judges that there is no user terminal recorded in a subscriber list (NO in step S33), a user of the first user terminal 21 is recorded as a next speaker in a subscriber list stored in the second memory 253 (step S35).

The central processing unit 251 of the PoC server 25 periodically transmits information indicative of a next speaker recorded in a subscriber list to the first to fourth user terminals 21 to 24.

When the central processing unit 251 of the PoC server 25 judges that there is a user terminal recorded in a subscriber list (YES in step S33), the central processing unit 251 reads a priority of a user who is presently speaking and a priority of a user who transmitted a request to speak (that is, a user of the first user terminal 21) out of the second memory 253 (step S36).

Then, the central processing unit 251 judges whether a priority of a user who transmitted a request to speak (that is, a user of the first user terminal 21) is higher than a priority of a user who is presently speaking (step S37).

If a priority of a user who transmitted a request to speak (that is, a user of the first user terminal 21) is higher than a priority of a user who is presently speaking, the central processing unit 251 stops a user who was speaking to speak, and allows a user who transmitted a request to speak (that is, a user of the first user terminal 21) to break into the conversation (step S38).

If a priority of a user who transmitted a request to speak (that is, a user of the first user terminal 21) is equal to a priority of a user who is presently speaking, or if a priority of a user who transmitted a request to speak (that is, a user of the first user terminal 21) is lower than a priority of a user who is presently speaking (NO in step S37), the central processing unit 251 records a user who transmitted a request to speak (that is, a user of the first user terminal 21), in a subscriber list as a next or second or more next speaker in accordance with his/her priority (step S39).

If there is a user recorded in a subscriber list as a next speaker (YES in step S34), the central processing unit 251 of the PoC server 25 records a user who transmitted a request to speak (that is, a user of the first user terminal 21), in a subscriber list as a next or second or more next speaker.

Figure 5:
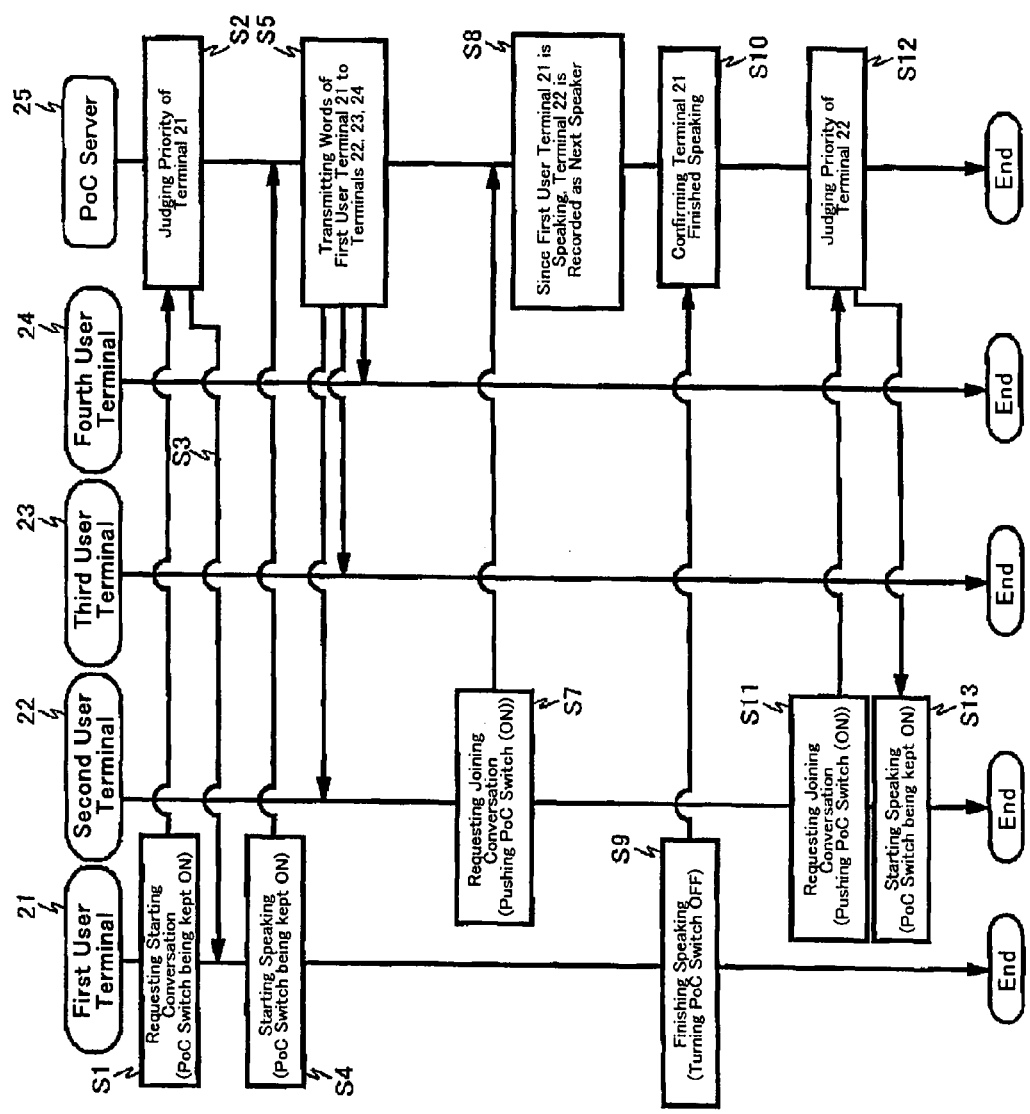
FIG. 5 is a sequence chart showing steps to be carried out when one of users (for instance, a user of a second user terminal) wants to speak while another user (for instance, a user of a first user terminal) is speaking.

FIG. 5 is a sequence chart showing steps to be carried out when a user (for instance, a user of the second user terminal 22) wants to speak while another user (for instance, a user of the first user terminal 21) is speaking.

Hereinbelow are explained, with reference to FIG. 5, steps to be carried out when a user of the second user terminal 22 is recorded as a next speaker, and steps to be carried out until a user of the second user terminal 22 having been recorded as a next speaker actually starts speaking.

First, each of users of the first to fourth user terminals 21 to 24 transmits a request to the PoC server 25 to join a conversation session.

The second memory 253 stores a telephone number list of mobile phones of users allowed to join a conversation session.

On receipt of a request from a user of the user terminal to join a conversation session, the central processing unit 251 judges whether a phone number of the user terminal of a user having transmitted a request to join a conversation session is recorded in a phone number list stored in the second memory 253. If a phone number of the user terminal of the user is recorded in a phone number stored in the second memory 253, the user is allowed to join a conversation session.

It is assumed in the explanation made below that users of the first to fourth user terminals 21 to 24 have already transmitted a request to the PoC server 25 to join the conversation, the central processing unit 251 of the PoC server 25 allows the users to join the conversation, a communication channel is established among the first to fourth user terminals 21 to 24, and the users join the conversation in the same hierarchy.

A user of the first user terminal 21 keeps the PoC switch 9 pushed to transmit a request to start speaking to the PoC server 25 (step S1).

On receipt of the request from the first terminal 21, the PoC server 25 reads conversation session data out of the second memory 253. Only when there is no user terminal who is presently speaking, and there are no users recorded in a subscriber list, the PoC server 25 makes a decision that a user of the first user terminal 21 is entitled to speak (step S2).

Then, the central processing unit 251 transmits the decision to the first user terminal 21 to allow a user of the first user terminal 21 to speak (step S3).

Steps S2 and S3 carried out in the PoC server 25 correspond to steps S32 and S34 illustrated in FIG. 4.

On receipt of the decision, a user of the first user terminal 21 starts speaking, and transmits content of speaking to the PoC server 25 (step S4).

On receipt of the content of speaking from the first user terminal 21, the PoC server 25 makes access to user terminal information stored in the second memory 253, and compares speaking priorities to each other. In this case, since there is no user terminals having a speaking priority, the PoC server 25 transmits the content of speaking received from the first user terminal 21 to the second to fourth user terminals 22 to 24 in multi-casting communication (step S5).

Step S5 corresponds to step S40 illustrated in FIG. 4.

Then, it is assumed that while a user of the first user terminal 21 is entitled to speak, a user of the second user terminal 22 keeps the PoC switch 9 pushed to transmit a request to speak to the PoC server 25 (step S7).

On receipt of the request from the second user terminal 22, the central processing unit 251 of the PoC server 25 makes access to PoC session information stored in the second memory 253, and reads a priority assigned to a user of the second user terminal 22 out of the second memory 253.

Then, the central processing unit 251 compares a priority of a user of the first user terminal 21 who is presently speaking to a priority of a user of the second user terminal 22 (step S37 in FIG. 4).

The PoC server 25 judges that a user of the second user terminal 22 has a priority lower than a priority of a user of the first user terminal 21 who is presently speaking, and further judges that there are not recorded user terminals in a subscriber list stored in the second memory 253.

As a result, the central processing unit 251 records a user of the second user terminal 22 in a subscriber list stored in the second memory 253 as a first subscriber (step S8).

Step S8 corresponds to steps S32, S33 and S35 illustrated in FIG. 4.

Various rules may be used as a rule for determining which is higher or lower among two or more priorities.

For instance, the second memory 253 stores therein various data of the first to fourth user terminals 21 to 24. One of such data stored in the second memory 253 is residual power of a battery of the first to fourth user terminals 21 to 24. The central processing unit 251 may be designed to compare residual power of batteries of the first to fourth user terminals 21 to 24 to one another, and apply a higher priority to a user terminal including a battery having smaller residual power.

This is because since a user terminal including a battery having small residual power has low ability for making communication, it can join conversation just for a limited period of time.

As an alternative, a higher priority may be assigned to a user terminal including an antenna having smaller sensitivity.

These data used for determining a priority of users is periodically transmitted to the central processing unit 251 of the PoC server 25 from each of the first to fourth user terminals 21 to 24. On receipt of these data, the central processing unit 251 updates data stored in the second memory 253 with the received data.

Thereafter, it is assumed that a user of the first user terminal 21 finished his/her speaking, and then, the user turned the PoC switch 9 off (step S9).

When the central processing unit 251 of the PoC server 25 detects that signal transmission from the first user terminal 21 ceased, the central processing unit 251 carries out a predetermined step for a user of the first user terminal 21. Specifically, the central processing unit 251 puts the first user terminal 21 into a condition in which the first user terminal 21 can only receive signals from the central processing unit 251 like other user terminals (step S10).

Data indicating that a user of the first user terminal 21 finished speaking is input into the second memory 253. Data indicative of communication status of the first user terminal 21 is updated with the previously mentioned data.

Then, when no users are going to speak in a conversation session, it is assumed that a user of the second user terminal 22 keeps the PoC switch 9 pushed to transmit a request to speak to the PoC server 25 (step S11).

On receipt of the request from the second user terminal 22, the central processing unit 251 of the PoC server 25 makes access to a subscriber list stored in the second memory 253. Confirming that a user of the second user terminal 22 is recorded as a first subscriber, the central processing unit 251 transmits an allowance to speak to the second user terminal 22 (step S12).

On receipt of the allowance from the central processing unit 251, a user of the second user terminal 22 starts speaking, and content of his/her speaking is transmitted to the PoC server 25 from the second user terminal 22 (step S13).

Then, steps identical with steps S5 and S7 to S10 are carried out.

As mentioned above, in the multi-casting communication system in accordance with the first embodiment, on receipt of a signal transmitted from a first mobile communication terminal (corresponding to the second user terminal 22 in the first embodiment) among a plurality of mobile communication terminals with a PoC switch being kept on, if there is a second mobile communication terminal presently making multi-casting communication (corresponding to the first user terminal 21 in the first embodiment), and further if there is not recorded a mobile communication terminal in a subscriber list, the central processing unit 251 of the PoC server 25 records the first mobile communication terminal (corresponding to the second user terminal 22 in the first embodiment) in a subscriber list, and allows the first mobile communication terminal to start speaking, after the second mobile communication terminal (corresponding to the first user terminal 21 in the first embodiment) has finished speaking.

If two or more users want to speak next, the central processing unit 251 compares priorities assigned to the users with one another, and allows a user having a highest priority to speak.

In the multi-casting communication system in accordance with the first embodiment, since a speaking order is rationally determined, it would be possible to ensure smooth conversation (multi-casting communication) in a group of mobile communication terminal users.

Each of the first to fourth user terminals 21 to 24 in the multi-casting communication system in accordance with the first embodiment is comprised of the foldable mobile phone 1 illustrated in FIG. 1. In place of the foldable mobile phone 1, the first to fourth user terminals 21 to 24 may be comprised of a mobile phone other than a foldable mobile phone, PHS (Personal Handy-phone System), PDA (Personal Data Assistance or Personal Digital Assistant), or a mobile data device, for instance.

Second Exemplary Embodiment

A multi-casting communication system in accordance with the second embodiment is structurally identical with the multi-casting communication system in accordance with the first embodiment, but is different from the multi-casting communication system in accordance with the first embodiment in performances of the central processing unit 251 of the PoC server 25.

The central processing unit 251 in the second embodiment periodically receives data indicative of communication status from each of the first to fourth user terminals 21 to 24. Each time the central processing unit 251 receives such data, data indicative of communication status of the first to fourth user terminals 21 to 24 stored in the second memory 253 is updated with the newly received data.

These data is disclosed to all of user terminals allowed by the central processing unit 251 to make access to the central processing unit 251, including the first to fourth user terminals 21 to 24 joining to a conversation session.

The disclosed data is displayed in the display unit 5 of each of the first to fourth user terminals 21 to 24.

FIGS. 6A-6D show examples example of images displayed in the display units 5 of the first to fourth user terminals 21 to 24 joining to a conversation session.

Figure 6A:
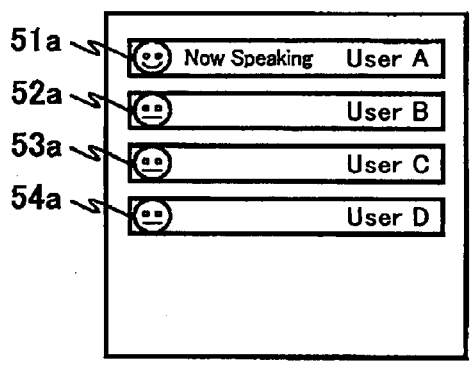
FIGS. 6A-6D show examples of images displayed in a display unit of each of first to fourth user terminals joining to a conversation session.

For instance, when a user of the first user terminal 21 is presently speaking, and no users of the second to fourth user terminals 22 to 24 are recorded in a subscriber list as a next speaker, as illustrated in FIG. 6A, a column 51*a* indicative of the display unit 5 of the first user terminal 21 displays "Now Speaking", and columns 52*a*, 53*a* and 54*a* indicative of the display units 5 of the second to fourth user terminals 22 to 24, respectively, display no images.

This indicates that only a user A of the first user terminal 21 is presently speaking.

A condition illustrated in FIG. 6A corresponds to a condition of a user of the first user terminal 21 in step S4 illustrated in FIG. 5.

Figure 6B:
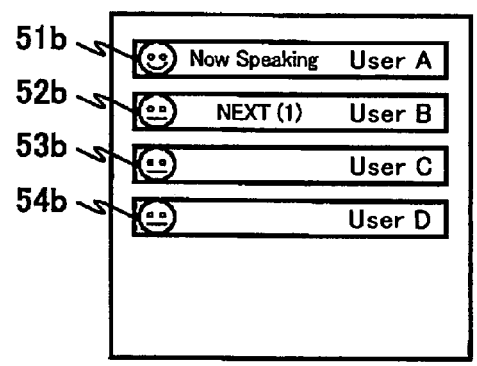

When a user of the first user terminal 21 is presently speaking, a user of the second user terminal 22 is recorded as a next speaker in a subscriber list, and no users of the third and fourth user terminals 23 and 24 are recorded in a subscriber list as a subscriber, as illustrated in FIG. 6B, a column 51*a* indicative of the display unit 5 of the first user terminal 21 displays "Now Speaking", a column 52*b* indicative of the display unit 5 of the second user terminal 22 displays "NEXT(1)", and columns 53*b* and 54*b* indicative of the display units 5 of the third and fourth user terminals 23 and 24, respectively, display no images.

This indicates that a user A of the first user terminal 21 is presently speaking, and a user B of the second user terminal 22 is recorded as a next speaker in a subscriber list.

A condition illustrated in FIG. 6B] corresponds to a condition of a user of the second user terminal 22 in step S8 illustrated in FIG. 5.

Figure 6C:
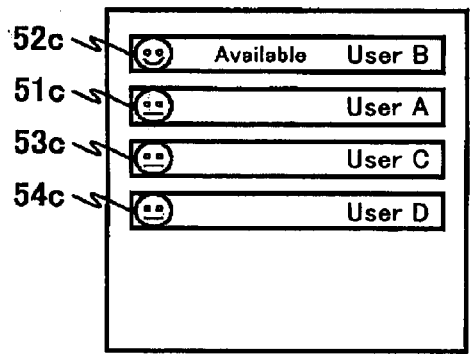
Figure 6D:
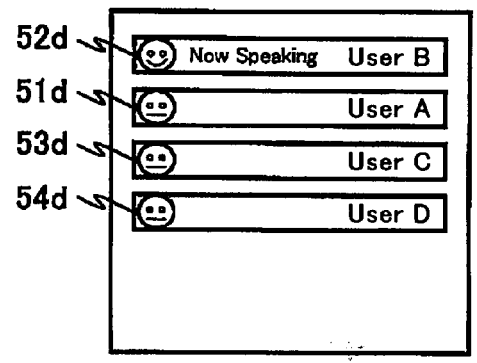

When a user of the first user terminal 21 has finished speaking, a user of the second user terminal 22 is in an allowed condition to start speaking, and no users of the third and fourth user terminals 23 and 24 are recorded in a subscriber list as a subscriber, as illustrated in FIG. 6C, a column 51*a* indicative of the display unit 5 of the first user terminal 21 displays no images, a column 52*b* indicative of the display unit 5 of the second user terminal 22 displays "Available", and columns 53b and 54b indicative of the display units 5 of the third and fourth user terminals 23 and 24, respectively, display no images.

A condition illustrated in FIG. 6C corresponds to a condition in step S9 illustrated in FIG. 5. The user A is treated similarly to other users who are presently not speaking (that is, users of the third and fourth user terminals 23 and 24).

When a user B of the second user terminal 22 having been allowed to speak starts speaking, as illustrated in FIG. 6 D, a column 52d indicative of the display unit 5 of the second user terminal 22 displays "Now Speaking", and columns 51d, 53d and 54d indicative of the display units 5 of the first, third and fourth user terminals 21, 23 and 24 display no images.

This indicates that only a user B of the second user terminal 22 starts speaking, and indicates a condition of a user of the second user terminal 22 in step S13 illustrated in FIG. 5.

Figure 7A:
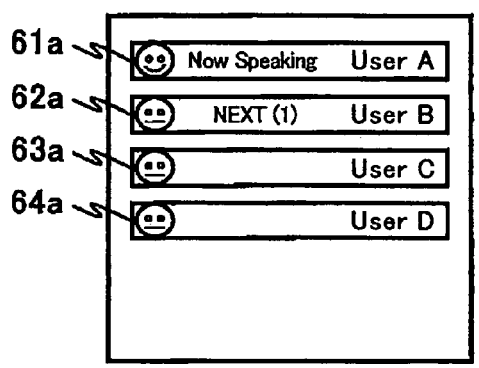
FIGS. 7A and 7B show examples of images displayed in a display unit of first to fourth user terminals in the case that while one of users is speaking, other users are successively recorded in a subscriber list.
Figure 7B:
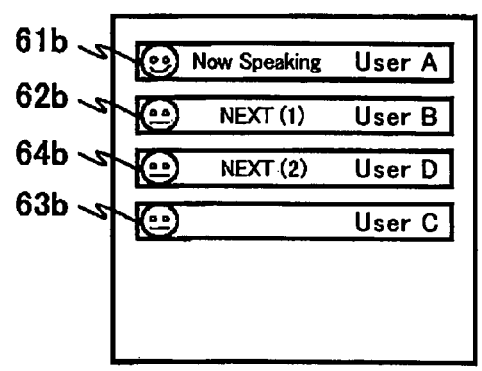

FIGS. 7A and 7B show examples of images displayed in the display units 5 of the first to fourth user terminals 21 to 24 in the case that while one of users is speaking, other users are successively recorded in a subscriber list.

When, while a user A of the first user terminal 21 is presently speaking, a user B of the second user terminal 22 is recorded as a next speaker in a subscriber list, as illustrated in FIG. 7A, a column 61a indicative of the display unit 5 of the first user terminal 21 displays "Now Speaking", a column 62a indicative of the display unit 5 of the second user terminal 22 displays "NEXT(1)", and columns 63a and 63b indicative of the display units 5 of the third and fourth user terminals 23 and 24, respectively, display no images.

When, while a user A of the first user terminal 21 is presently speaking, a user B of the second user terminal 22 is recorded as a next speaker in a subscriber list, and then, a user D of the fourth user terminal 24 is recorded as a second next speaker in a subscriber list, as illustrated in FIG. 7B, a column 61b indicative of the display unit 5 of the first user terminal 21 displays "Now Speaking", a column 62b indicative of the display unit 5 of the second user terminal 22 displays "NEXT (1)", a column 64b indicative of the display unit 5 of the fourth user terminal 24 displays "NEXT(2)", and a column 63b indicative of the display unit 5 of the third user terminal 23 displays no images.

As mentioned above, in the multi-casting communication system in accordance with the second embodiment, while one of users of the first to fourth user terminals 21 to 24 joining to a conversation session is speaking, if another user is recorded as a next speaker in a subscriber list stored in the second memory 253, data about the another user is displayed in the display units 5 of the first to fourth user terminals 21 to 24, as illustrated in FIGS. 6 and 7.

Since the users commonly have information indicative of subscribers, it is obvious to all of the users as to who will speak next, ensuring smooth conversation session.

Third Exemplary Embodiment

Even if a user were recorded as a next speaker in a subscriber list, the user might be necessary thereafter to cancel the recordation for some reason.

Accordingly, each of the first to fourth user terminals 21 to 24 in the multi-casting communication system in accordance with the third embodiment is designed to have a function of canceling recordation in a subscriber list.

A user of each of the first to fourth user terminals 21 to 24 can cancel his/her recordation in a subscriber list, after he/she was recorded as a next or subsequent speaker in a subscriber list, by pushing the PoC switch 9 again.

For instance, after confirming a subscriber list as illustrated in FIGS. 6 and 7, in the display unit 5, if there is another user who is appropriate as a next speaker, a user who was recorded as a next speaker in a subscriber list can cancel his/her recordation in a subscriber list, and allows the another user to speak next.

FIGS. 8A, 8B, 9A and 9B show how images displayed in the display unit 5 vary when recordation is canceled.

Figure 8A:
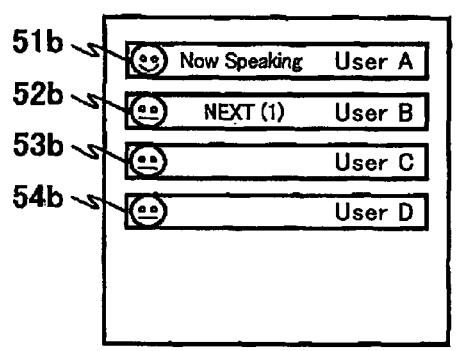
FIGS. 8A and 8B show how images displayed in a display unit vary when recordation is canceled.

For instance, as illustrated in FIG. 6B, it is assumed that a user of the first user terminal 21 is presently making multi-casting communication, and a user of the second user terminal 22 is recorded as a next speaker in a subscriber list (FIG. 8A).

Figure 8B:
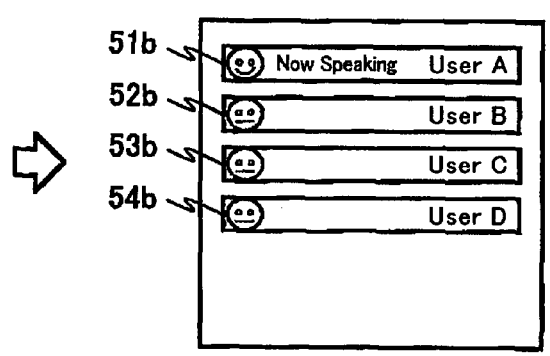
Figure 9A:
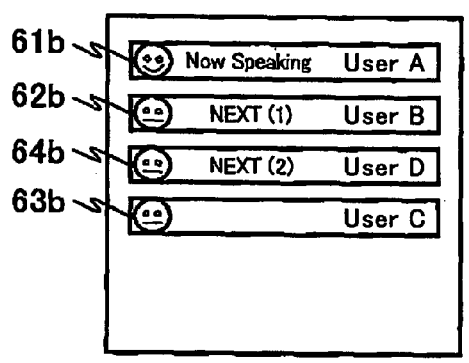
FIGS. 9A and 9B show how images displayed in a display unit vary when recordation is canceled.
Figure 9B:
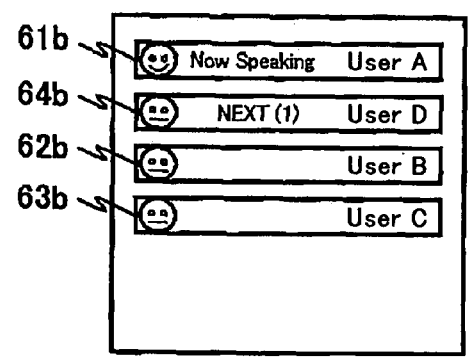

If a user of the second user terminal 22 pushes the PoC switch 9, the recordation of a user of the second user terminal 22 in a subscriber list is cancelled, and accordingly, the indication "NEXT(1)" displayed in a column 52b indicative of the display unit 5 of the second user terminal 22 fades out (FIG. 8B).

It is assumed as illustrated in FIG. 7B that a user of the first user terminal 21 is presently speaking, a user of the second user terminal 22 is recorded as a next speaker in a subscriber list, and a user of the fourth user terminal 24 is recorded as a second next speaker in a subscriber list.

If a user of the second user terminal 22 pushes the PoC switch 9, the recordation of a user of the second user terminal 22 in a subscriber list is cancelled, and accordingly, the indication "NEXT(1)" displayed in a column 62b indicative of the display unit 5 of the second user terminal 22 fades out, and the indication "NEXT(2)" displayed in a column 64b indicative of the display unit 5 of the fourth user terminal 24 is changed into the indication "NEXT(1)". That is, a user of the fourth user terminal 24 becomes a next speaker.

Cancellation of the recordation in a subscriber list can be accomplished not only by pushing the PoC switch 9 again, but also by carrying out another action.

For instance, each of the first to fourth user terminals 21 to 24 may be designed to include a cancellation switch apart from the PoC switch 9. As an alternative, any one of a plurality of keys defining the input unit 7 may be used as a cancellation switch, in which case, for instance, cancellation may be admitted only when a first key and a second key among a plurality of keys are successively pushed.

The central processing unit 251 of the PoC server 25 may mandatorily cancel the recordation in a subscriber list in accordance with a predetermined rule.

Fourth Exemplary Embodiment

In a multi-casting communication system in accordance with the fourth embodiment, one of the first to fourth user terminals 21 to 24 is designated as a privilege user's terminal.

A privilege user's terminal is designed to arbitrarily determine who will speak next among other user terminals.

Figure 10:
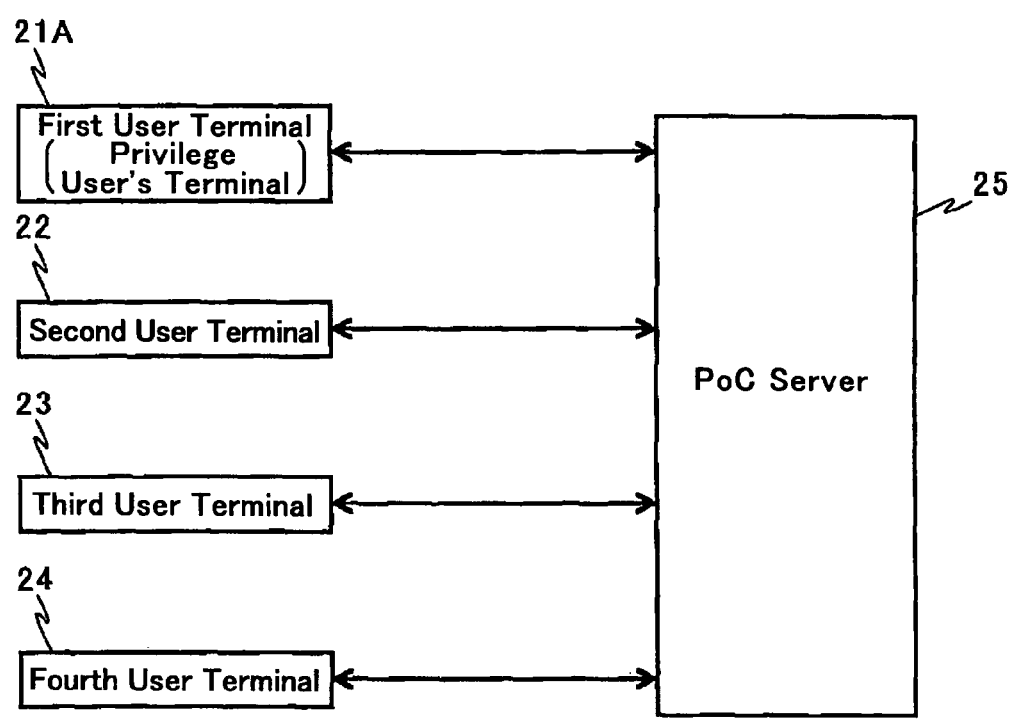
FIG. 10 is a block diagram of the multi-casting communication system in accordance with the fourth embodiment.

FIG. 10 is a block diagram of a multi-casting communication system in accordance with the fourth embodiment.

As illustrated in FIG. 10, it is assumed that a first user terminal 21A is designated as a privilege user's terminal among the first to fourth user terminals 21 to 24.

For instance, when a user of other user terminal is recorded as a next speaker in a subscriber list, the first user terminal 21A can mandatorily cancel the recordation. As an alternative, when a plurality of users of user terminals are recorded in a subscriber list, the first user terminal 21A can change their priorities. Furthermore, even if a certain user of a user terminal does not transmit a request to speak, the first user terminal 21A can record the certain user as a next speaker in a subscriber list. As an alternative, the first user terminal 21A, while a user of a user terminal is speaking, can stop the user from speaking, and provides an allowance to speak to another user.

As mentioned above, the first user terminal 21A designated as a privilege user's terminal is entitled to change a speaking order among subscribers recorded in a subscriber list, cancel an allowance to speak, allow a user to break into conversation, and carry out other actions.

When two or more users having priorities equal to one another request to speak at a time, the central processing unit 251 allows a user to speak in an order in which the central processing unit 251 receives a request to speak, or statistically randomly allow a user to speak. However, it is sometimes preferable to determine a speaking order not in accordance with such a rule in order to ensure smooth conversation. In such a case, the first user terminal 21A as a privilege user's terminal may determine a speaking order in dependence on circumstance to thereby ensure smooth conversation.

That is, the first user terminal 21A as a privilege user's terminal can arbitrarily change a priority of a certain user to allow him/her to speak in dependence on content of conversation.

Fifth Exemplary Embodiment

The multi-casting communication systems in accordance with the above-mentioned first to fourth embodiments is designed to include a single PoC server 25. A multi-casting communication system may be designed to include two servers in place of a single PoC server 25.

Figure 11:
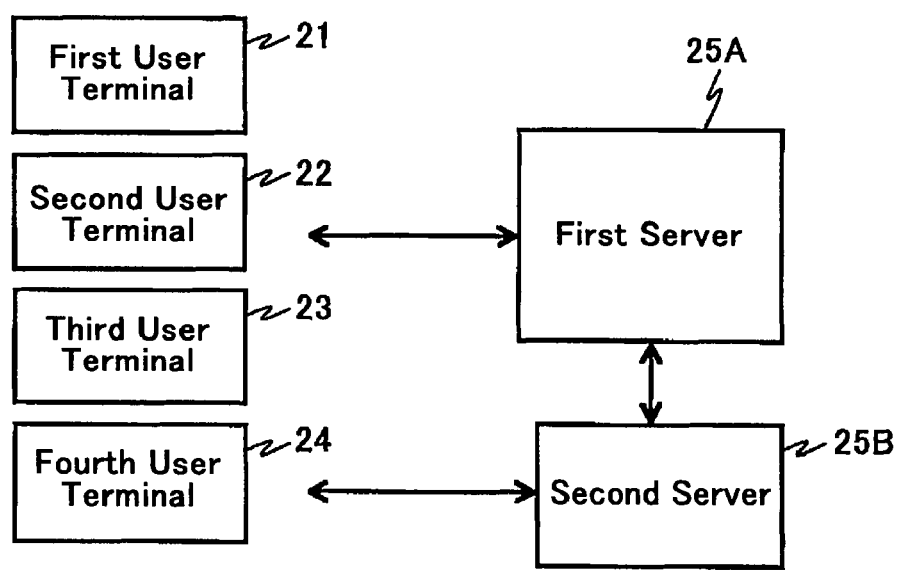
FIG. 11 is a block diagram of the multi-casting communication system in accordance with the fifth embodiment.

FIG. 11 is a block diagram of a multi-casting communication system in accordance with the fifth embodiment.

The multi-casting communication system in accordance with the fifth embodiment is different from the multi-casting communication system in accordance with the first embodiment illustrated in FIG. 2 only in a structure of a server.

Specifically, the multi-casting communication system in accordance with the fifth embodiment is designed to include a first server 25A and a second server 25B in place of the PoC server 25 used in the multi-casting communication system in accordance with the first embodiment.

Each of the first server 25A and the second server 25B is designed to be able to make communication with the first to fourth user terminals 21 to 24 through a network. Furthermore, the first server 25A and the second server 25B are designed to be able to make communication with each other.

Figure 12:
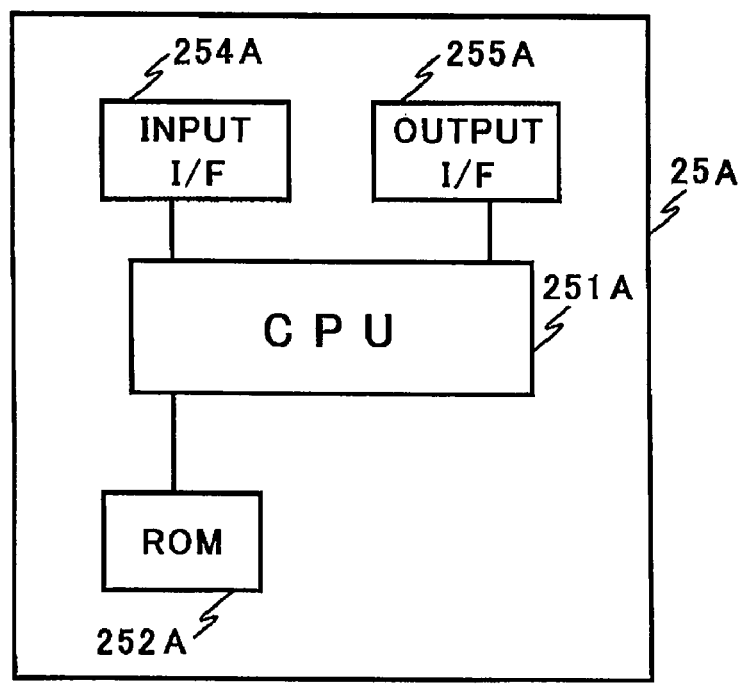
FIG. 12 is a block diagram of a first server in the multi-casting communication system in accordance with the fifth embodiment.

FIG. 12 is a block diagram of the first server 25A.

The first server 25A is comprised of a central processing unit (CPU) 251A, a first memory 252A comprised of ROM, an input interface 254A through which various commands and data are input into the central processing unit 251A, and an output interface 255A through which results of steps executed by the central processing unit 251A are output.

The first memory 252A, the input interface 254A and the output interface 255A in the first server 25A are designed to have the same function as the functions of the first memory 252, the input interface 254, and the output interface 255 in the PoC server 25 in the first embodiment, respectively.

Figure 13:
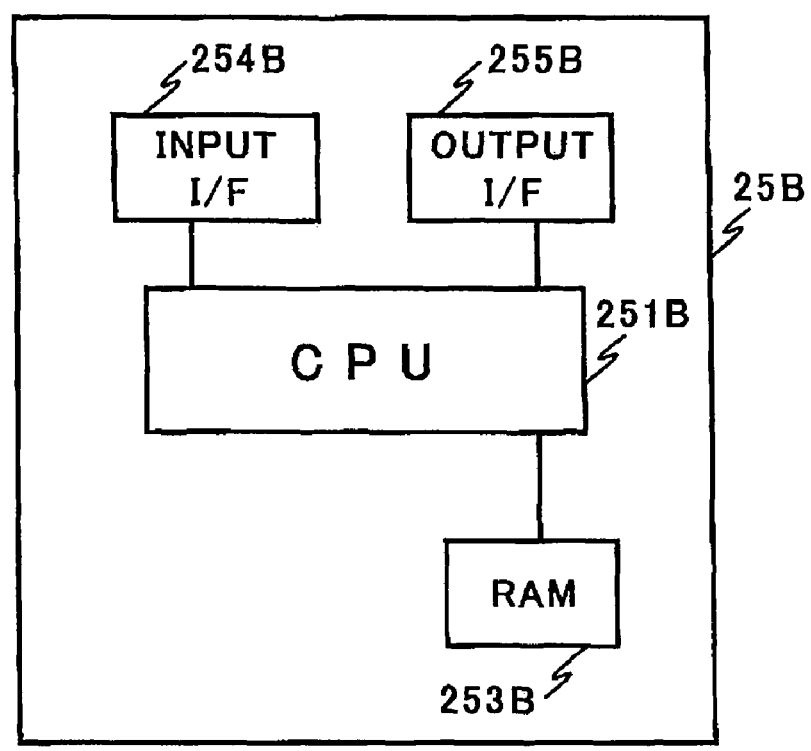
FIG. 13 is a block diagram of a second server in the multi-casting communication system in accordance with the fifth embodiment.

FIG. 13 is a block diagram of the second server 25B.

The second server 25B is comprised of a central processing unit (CPU) 251B, a second memory 253B comprised of RAM, an input interface 254B through which various commands and data are input into the central processing unit 251B, and an output interface 255B through which results of steps executed by the central processing unit 251B are output.

The second memory 253B, the input interface 254B and the output interface 255B in the second server 25B are designed to have the same function as the functions of the second memory 253, the input interface 254, and the output interface 255 in the PoC server 25 in the first embodiment, respectively.

That is, the second server 25B in the fifth embodiment carries out steps carried out by the second memory 253 in the PoC server 25 in the first embodiment. The fifth embodiment is different from the first embodiment in that wherein the second memory 253 in the first embodiment is controlled by the central processing unit 251, the second memory 253B in the fifth embodiment is controlled by the central processing unit 251B operating independently of the central processing unit 251A.

The first server 25A carries out steps other than steps to be carried out by the second server 25B among steps to be carried out by the PoC server 25 in the first embodiment.

For instance, the second memory 253B in the second server 25B stores therein a priority for speaking of each of users, and a subscriber list. The central processing unit 251B of the second server 25B stores data about the first to fourth user terminals 21 to 24 received from users of the first to fourth user terminals 21 to 24, into the second memory 253B, and updates a priority for speaking of each of users, and a subscriber list.

In accordance with the fifth embodiment, since the multi-casting communication system includes two servers, it is possible to reduce a load to be exerted on each of servers, and enhance a processing rate in each of servers, in comparison with a multi-casting communication system including a single server.

Figure 14:
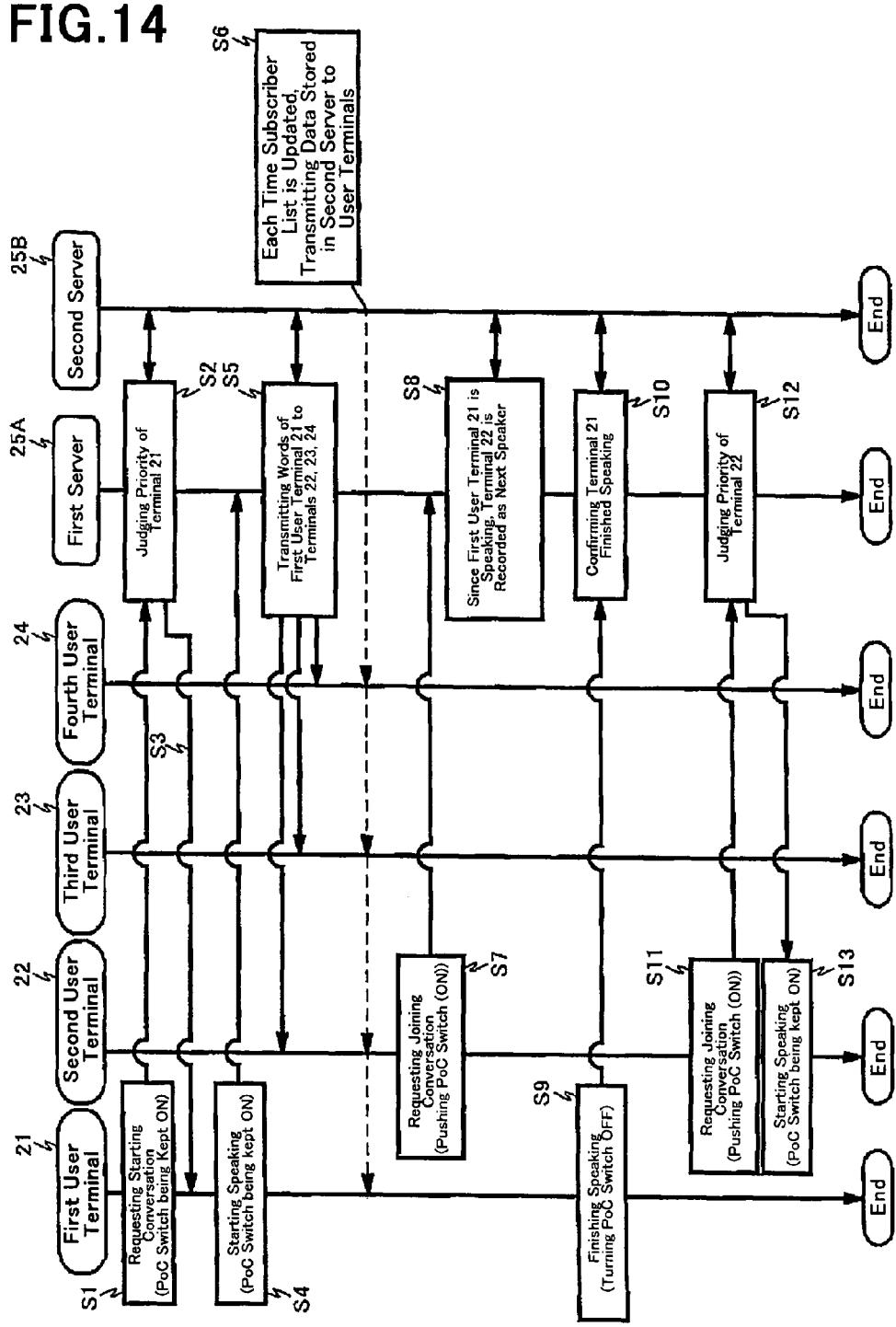
FIG. 14 is a sequence chart showing steps to be carried out by the first and second servers in the multi-casting communication system in accordance with the fifth embodiment.

FIG. 14 is a sequence chart, similar to FIG. 5, showing steps to be carried out by the first server 25A and the second server 25B in the multi-casting communication system in accordance with the fifth embodiment.

As is obvious in comparison of FIGS. 14 and 5 with each other, the first server 25A in the fifth embodiment carries out the same steps as the steps carried out by the PoC server 25 in the first embodiment. Furthermore, when the first server 25A carries out steps (steps S2, S5, S8, S10 and S12), the first server 25A retrieves data stored in the second server 25B such as a subscriber list.

Each time a subscriber list is updated, the second server 25B transmits requisite data stored therein such as a subscriber list to the first to fourth user terminals 21 to 24 (step S6). The data transmitted from the second server 25B is displayed in the display unit 5 of each of the first to fourth user terminals 21 to 24.

Sixth Exemplary Embodiment

Figure 15:
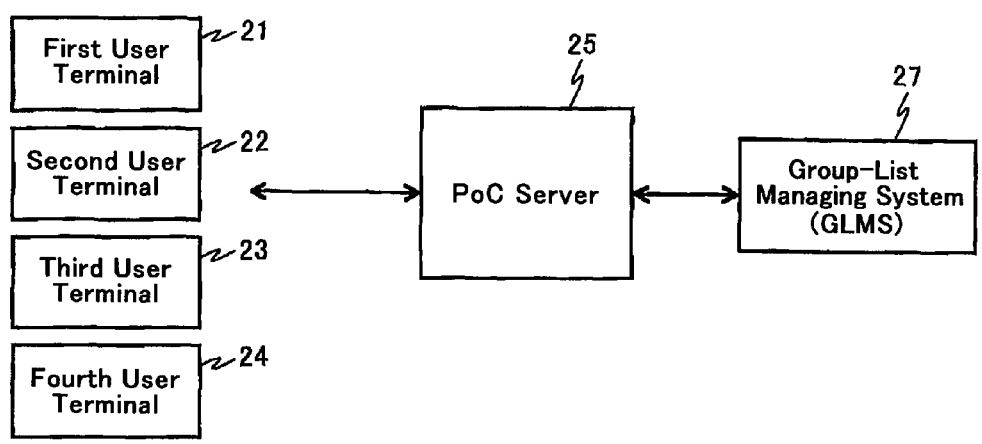
FIG. 15 is a block diagram of the multi-casting communication system in accordance with the sixth embodiment.

FIG. 15 is a block diagram of a multi-casting communication system in accordance with the sixth embodiment.

In comparison with the multi-casting communication system in accordance with the first embodiment illustrated in FIG. 2, the multi-casting communication system in accordance with the sixth embodiment is designed to additionally include a group-list managing system (GLMS) 27.

As illustrated in FIG. 15, the group-list managing system 27 is designed to be able to make communication with the first to fourth user terminals 21 to 24 through the PoC server 25.

The group-list managing system 27 stores data relating to requirements necessary for a user to join a conversation session. On receipt of a request to join a conversation session from a user of a user terminal, the central processing unit 251 of the PoC server 25 determines whether the user is allowed to join a conversation session in accordance with the data stored in the group-list managing system 27.

The group-list managing system 27 may be applied to the multi-casting communication system in accordance with the fifth embodiment.

In such a case, the group-list managing system 27 is designed to be able to make communication with the first server 25A, for instance.

The exemplary advantages obtained by the above-mentioned exemplary embodiments are described hereinbelow.

As mentioned above, in the multi-casting communication system in accordance with the above-mentioned exemplary embodiments, on receipt of a signal transmitted from a first mobile communication terminal among a plurality of mobile communication terminals, requesting joining the conversation, the controller, if there is a second mobile communication terminal presently making multi-casting communication, and further if there is not recorded a mobile communication terminal in a subscriber list, records the first mobile communication terminal in the subscriber list, and allows the first mobile communication terminal to start speaking, after the second mobile communication terminal has finished speaking. If two or more users want to speak next, the controller compares priorities assigned to the users with one another, and allows a user having a highest priority to speak. In the multi-casting communication system in accordance with the above-mentioned exemplary embodiments, since a speaking order is rationally determined, it would be possible to ensure smooth conversation (multi-casting communication) in a group of mobile communication terminal users.

If a user is recorded in a subscriber list as a next speaker while another user among a plurality of users joining a conversation session is speaking, information indicative of the next speaker is transmitted to the other users. Thus, all of users in a group commonly have information indicative of the next speaker, and it is obvious for members of a group as to who will speak next, ensuring smooth conversation session.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

This application is based upon and claims the benefit of priority from Japanese Patent Application No. 2005-008907 filed on Jan. 17, 2005, the entire disclosure of which, including specification, claims, drawings and summary, is incorporated herein by reference in its entirety.

The invention claimed is:

1. A multi-casting communication system configured to allow a plurality of mobile communication terminals to conduct multi-casting communication with one another in a half-duplex manner, comprising:
the plurality of mobile communication terminals, each configured to conduct voice-communication with other mobile communication terminals through a base station, and each of the plurality of mobile communication terminals comprising a half-duplex communication switch; and
a controller,
wherein said controller is configured to communicate with said plurality of mobile communication terminals through a network, and further configured to allow each of said plurality of mobile communication terminals to participate in a multi-casting session in accordance with predetermined rules,
wherein, when a signal is received from a first mobile communication terminal among said plurality of mobile communication terminals with said half-duplex communication switch of the first mobile communication terminal being on, said controller is configured to check whether there is a second mobile communication terminal among said plurality of mobile communication terminals which is associated with a user that is presently speaking in the multi-casting session,
if there is not said second mobile communication terminal, and further if there is not recorded one or more third mobile communication terminals among said plurality of mobile communication terminals in a subscriber list, said controller is configured to allow a user associated with said first mobile communication terminal to speak in the multi-casting session,
if there is at least one of said second mobile communication terminal and said one or more third mobile communication terminals recorded in said subscriber list, said controller is configured to record said first mobile communication terminal in said subscriber list to thereby reserve a speaking position for the user associated with said first mobile communication terminal,
wherein when a signal is received from said one or more third mobile communication terminals recorded in said subscriber list with said half-duplex communication switch being on, said controller is configured to remove recordation of said third mobile communication terminal from said subscriber list.

2. The multi-casting communication system as set forth in claim 1, wherein said controller is configured to: update data about a communication status for each of said plurality of mobile communication terminals, record a mobile communication terminal among said plurality of mobile communication terminals which is associated with a user that is allowed to speak in the multi-casting session next time or later in the subscriber list, and transmit data about the communication status of one or more mobile communication terminals recorded in said subscriber list, to other mobile communication terminals participating in the multi-casting session.

3. The multi-casting communication system as set forth in claim 1, wherein a priority is applied to each of said plurality of mobile communication terminals in accordance with a characteristic thereof, and wherein, said controller, when said first mobile communication terminal is to be recorded in said subscriber list, is configured to record said first mobile communication terminal and said one or more third mobile communication terminals recorded in said subscriber list in an order determined in accordance with said priority.

4. The multi-casting communication system as set forth in claim 3, wherein, when the signal is received from said first mobile communication terminal with said half-duplex communication switch of the first mobile communication terminal being on, said controller, if there is said second mobile communication terminal associated with the user that is presently speaking in the multi-casting session, and further if there is recorded said one or more third mobile communication terminals in said subscriber list, is configured to compare priorities of said first and second mobile communication terminals to each other, and allow said first mobile communication terminal to interrupt the multi-casting session if said controller judges that said first mobile communication terminal has a priority higher than a priority of second mobile communication terminal.

5. The multi-casting communication system as set forth in claim 3, wherein said characteristic of said mobile communication terminals comprises a residual power of a battery of a mobile communication terminal, wherein a higher priority is given to a mobile communication terminal including a battery having low residual power.

6. The multi-casting communication system as set forth in claim 3, wherein said characteristic of said mobile communication terminals comprises a sensitivity of an antenna of a mobile communication terminal, and a higher priority is given to a mobile communication terminal including an antenna having a low sensitivity.

7. The multi-casting communication system as set forth in claim 1, wherein a predetermined one of said plurality of mobile communication terminals is determined to be a privilege user's terminal, and
wherein a priority is applied to mobile communication terminals other than said privilege user's terminal in accordance with a characteristic thereof, and
wherein said privilege user's terminal is entitled to: record mobile communication terminals other than said privilege user's terminal into said subscriber list, delete mobile communication terminals other than said privilege user's terminal from said subscriber list, and interrupt the multi-casting session.

8. The multi-casting communication system as set forth in claim 1, wherein said controller comprises a first server and a second server that is configured to communicate with said first server,
wherein said first server is configured to communicate with said plurality of mobile communication terminals through the network, and further configured to allow each of said plurality of mobile communication terminals to participate in a multi-casting session in accordance with predetermined rules,
wherein, when the signal is received from the first mobile communication terminal among said plurality of mobile communication terminals, said first server is configured to check whether there is the second mobile communication terminal associated with the user presently speaking in the multi-casting session,
if there is not said second mobile communication terminal, and further if there is not recorded the one or more third mobile communication terminals in the subscriber list, said first server is configured to allow a user associated with said first mobile communication terminal to speak in the multi-casting session,
if there is at least one of said second mobile communication terminal and said third mobile communication terminal recorded in said subscriber list, said first server is configured to record said first mobile communication terminal in said subscriber list to thereby reserve the speaking position for said first mobile communication terminal, and
said second server is configured to: update data about a communication status of each of said plurality of mobile communication terminals, record a mobile communication terminal of said plurality of mobile communication terminals which is to be allowed to speak in the multi-casting session next time or later in the subscriber list, and transmit data about the communication status of the one or more mobile communication terminals recorded in said subscriber list, to other mobile communication terminals participating in the multi-casting session.

9. The multi-casting communication system as set forth in claim 8, further comprising an administrator configured to communicate with said plurality of mobile communication terminals through said first server, and administer said plurality of mobile communication terminals as a group for conducting the multi-casting session.

10. The multi-casting communication system as set forth in claim 1, further comprising an administrator configured to communicate with said plurality of mobile communication terminals through said controller, and administer said plurality of mobile communication terminals as a group for conducting the multi-casting session.

11. The multi-casting communication system as set forth in claim 1, wherein said mobile communication terminal comprises a mobile phone.

12. A server configured to allow a plurality of mobile communication terminals to conduct multi-casting communication with one another in a half-duplex manner, each of said mobile communication terminals being configured to conduct voice-communication with other mobile communication terminals through a base station, and each of the plurality of communication terminals comprising a half-duplex communication switch,
said server being configured to communicate with said plurality of mobile communication terminals through a network, and further configured to allow each of said plurality of mobile communication terminals to participate in a multi-casting session in accordance with a predetermined rule,
wherein, when a signal is received from a first mobile communication terminal among said plurality of mobile communication terminals with said half-duplex communication switch of the first mobile communication terminal being on, said server is configured to check whether there is a second mobile communication terminal associated with a user which is presently speaking in the multi-casting session,
if there is not said second mobile communication terminal, and further if there is not recorded one or more third mobile communication terminals among said plurality of mobile communication terminals in a subscriber list, said server is configured to allow a user associated with said first mobile communication terminal to speak in the multi-casting session,
if there is at least one of said second mobile communication terminal and said one or more third mobile communication terminals recorded in said subscriber list, said server is configured to record said first mobile communication terminal in said subscriber list to thereby reserve a speaking position for a user associated with said first mobile communication terminal, and
when a signal is received from said one or more third mobile communication terminals recorded in said subscriber list with said half-duplex communication switch being on, said server is configured to remove recordation of said third mobile communication terminal from said subscriber list.

13. The server as set forth in claim 12, wherein said server is configured to: update data about a communication status each of said plurality of mobile communication terminals, record a mobile communication terminal among said plurality of mobile communication terminals which is associated with a user that is allowed to speak in the multi-casting session next time or later in the subscriber list, and transmit data about the communication status of one or more mobile communication terminals recorded in said subscriber list, to other mobile communication terminals participating in the multi-casting session.

14. The server as set forth in claim 12, wherein a priority is applied to each of said plurality of mobile communication terminals in accordance with a characteristic thereof, and wherein,
    said server, when said first mobile communication terminal is to be recorded in said subscriber list, is configured to record said first mobile communication terminal and said one or more third mobile communication terminals in said subscriber list in an order determined in accordance with said priority.

15. The server as set forth in claim 12, wherein, when the signal is received from said first mobile communication terminal with said half-duplex communication switch of the first mobile communication terminal being on, said server, if there is said second mobile communication terminal associated with the user that is presently speaking, and further if there is recorded said one or more third mobile communication terminals in said subscriber list, is configured to compare priorities of said first and second mobile communication terminals to each other, and allow said first mobile communication terminal to interrupt the multi-casting session if said server judges that said first mobile communication terminal has a priority higher than a priority of second mobile communication terminal.

16. The server as set forth in claim 12, wherein said server comprises a first server and a second server that is configured to communicate with said first server,
    wherein said first server is configured to communicate with said plurality of mobile communication terminals through the network, and further configured to allow a user associated with one of said plurality of mobile communication terminals to speak in the multi-casting session in accordance with the predetermined rule,
    wherein, when the signal is received from the first mobile communication terminal among said plurality of mobile communication terminals, said first server is configured to check whether there is the second mobile communication terminal presently speaking in the multi-casting session,
        if there is not said second mobile communication terminal, and further if there is not recorded the one or more third mobile communication terminals in the subscriber list, said first server is configured to allow the user associated with said first mobile communication terminal to speak in the multi-casting session,
        if there is at least one of said second mobile communication terminal and said third mobile communication terminal recorded in said subscriber list, said first server is configured to record said first mobile communication terminal in said subscriber list to thereby reserve the speaking position for the user associated with said first mobile communication terminal, and
    said second server is configured to: update data about a communication status of each of said plurality of mobile communication terminals, record a mobile communication terminal among said plurality of mobile communication terminals which is associated with a user that is allowed to speak in said multi-casting session next time or later in the subscriber list, and transmit data about the communication status of the one or more mobile communication terminals recorded in said subscriber list, to other mobile communication terminals participating in the multi-casting session.

17. A method of allowing a plurality of mobile communication terminals to conduct multi-casting communication with one another through a server in a half-duplex manner, each of said mobile communication terminals configured to conduct voice-communication with other mobile communication terminals through a base station, and each of the plurality of mobile communication terminals comprising a half-duplex communication switch, comprising:
    allowing, via the server, each of said plurality of mobile communication terminals to participate in a multi-casting session in accordance with a predetermined rule;
    wherein, when a signal is received from a first mobile communication terminal among said plurality of mobile communication terminals with said half-duplex communication switch of the first mobile communication terminal being on, said server is configured to check whether there is a second mobile communication terminal among said plurality of mobile communication terminals which is associated with a user that is presently speaking in the multi-casting session;
    if there is not said second mobile communication terminal, and further if there is not recorded one or more third mobile communication terminals among said plurality of mobile communication terminals in a subscriber list, said server is configured to allow a user associated with said first mobile communication terminal to speak in the multi-casting session;
    if there is at least one of said second mobile communication terminal and said one or more third mobile communication terminals recorded in said subscriber list, said server is configured to record said first mobile communication terminal in said subscriber list to thereby reserve a speaking position for a user associated with said first mobile communication terminal; and
    when a signal is received from said third mobile communication terminal recorded in said subscriber list with said half-duplex communication switch of said third mobile communication terminal being on, said server is configured to remove recordation of said third mobile communication terminal from said subscriber list.

18. The method as set forth in claim 17, further comprising:
    said server updating data about a communication status of each of said plurality of mobile communication terminals;
    said server recording a mobile communication terminal which is associated with a user that is allowed to speak in the multi-casting session next time or later in the subscriber list; and
    said server transmitting data about a communication status of the one or more mobile communication terminals recorded in said subscriber list, to plurality of other mobile communication terminals participating in the multi-casting session.

19. The method as set forth in claim 18, wherein a predetermined one of said plurality of mobile communication terminals is determined as a privilege user's terminal, and a priority is applied to mobile communication terminals other than said privilege user's terminal in accordance with a characteristic thereof,
    said method further comprising said privilege user's terminal recording mobile communication terminals other than said privilege user's terminal into said subscriber list, deleting mobile communication terminals other than said privilege user's terminal from said subscriber list, and interrupting the multi-casting session.

20. The method as set forth in claim 17, wherein a priority is applied to each of said plurality of mobile communication terminals in accordance with a characteristic thereof, and wherein, in recording said first mobile communication terminal in said subscriber list, said first mobile communication terminal and said one or more third mobile communication terminals in said subscriber list are recorded in an order to be determined in accordance with said priority.

21. The method as set forth in claim 20, further comprising, on receipt of the signal transmitted from said first mobile communication terminal with said half-duplex communication switch being on, said server, if there is the user associated with said second mobile communication terminal presently speaking in the multi-casting session, and further if there is recorded said third mobile communication terminals in said subscriber list, comparing priorities of said first and second mobile communication terminals to each other, and allowing said first mobile communication terminal to interrupt the multi-casting session, if said server judges that said first mobile communication terminal has a priority higher than a priority of second mobile communication terminal.

22. The method as set forth in claim 17, further comprising, on receipt of a signal transmitted from said third mobile communication terminal recorded in said subscriber list with said half-duplex communication switch being on, said server canceling recordation of said third mobile communication terminal from said subscriber list.

23. An article of manufacture including a non-transitory, tangible computer-readable medium having instructions stored thereon that, when executed by a computing device, cause the computing device to perform operations comprising:

allowing each of a plurality of mobile communication terminals to participate in a multi-casting session in accordance with a predetermined rule;

wherein, when a signal is received from a first mobile communication terminal among said plurality of mobile communication terminals with a half-duplex communication switch of the first mobile communication terminal being on, checking whether there is a second mobile communication terminal is associated with a user which is presently speaking in the multi-cast session;

if there is not said second mobile communication terminal, and further if there is not recorded one or more third mobile communication terminals in a subscriber list, allowing a user associated with said first mobile communication terminal to speak in the multi-casting session;

if there is at least one of said second mobile communication terminal and said third mobile communication terminal recorded in said subscriber list, recording said first mobile communication terminal in said subscriber list to thereby reserve a speaking position for a user associated with said first mobile communication terminal; and when a signal is received from said third mobile communication terminal recorded in said subscriber list with a half-duplex communication switch of said third mobile communication terminal being on, removing recordation of said third mobile communication terminal from said subscriber list.

24. The article of manufacture as set forth in claim 12, wherein said operations further comprise:

updating data about a communication status of each of said plurality of mobile communication terminals;

recording a mobile communication terminal associated with a user which is to be allowed to speak in the multi-casting session next time or later in the subscriber list; and transmitting data about the communication status of one or more mobile communication terminals recorded in said subscriber list, to said other mobile communication terminals participating in the multi-casting session.

25. The article of manufacture as set forth in claim 23, wherein a priority is applied to each of said plurality of mobile communication terminals in accordance with a characteristic thereof, and wherein said first mobile communication terminal and said one or more third mobile communication terminals recorded in said subscriber list are recorded in an order to be determined in accordance with said priority.

26. The article of manufacture as set forth in claim 25, wherein operations further comprise:

on receipt of the signal transmitted from said first mobile communication terminal with said half-duplex communication switch being on, if there is said second mobile communication terminal associated with the user presently speaking in the multi-casting session, and further if there is recorded said third mobile communication terminal in said subscriber list, comparing priorities of said first and second mobile communication terminals to each other; and allowing said first mobile communication terminal to interrupt the multi-casting session, if judging that said first mobile communication terminal has a priority higher than a priority of second mobile communication terminal.

27. A multi-casting communication system allowing a plurality of mobile communication means to conduct multi-casting communication with one another in a half-duplex manner, comprising:

a plurality of mobile communication means each for making voice-communication with other mobile communication means through a base station, and each of the plurality of mobile communication means including a half-duplex communication switch; and control means for making communicating with said plurality of mobile communication means through a network, and allowing each of said plurality of mobile communication means to participate in a multi-casting session in accordance with predetermined rules, wherein, when a signal is received from a first mobile communication means among said plurality of mobile communication means with said half-duplex communication switch of the first mobile communication means being on, said control means is configured to check whether there is second mobile communication means associated with a user which is presently speaking in the multi-casting session, if there is not said second mobile communication means, and further if there is not recorded one or more third mobile communication means in a subscriber list, said control means is configured to allow a user associated with said first mobile communication means to speak in the multi-casting session, if there is at least one of said second mobile communication means and said third mobile communication means recorded in said subscriber list, said control means is configured to record said first mobile communication means in said subscriber list to thereby reserve a speaking position for the user associated with said first mobile communication means, when a signal is received from said one or more third mobile communication means recorded in said subscriber list with said half-duplex communication switch being on, said control means is configured to remove recordation of said third mobile communication means form said subscriber list.

* * * * *